United States Patent [19]
Hamakawa
[11] Patent Number: 4,958,198
[45] Date of Patent: Sep. 18, 1990

[54] AUTOMATIC DOCUMENT FEEDER AND A COPYING APPARATUS EQUIPPED WITH SUCH AN AUTOMATIC DOCUMENT FEEDER

[75] Inventor: Wataru Hamakawa, Toyokawa, Japan
[73] Assignee: Minolta Camera Kabushiki Kaisha, Osaka, Japan

[21] Appl. No.: 421,408
[22] Filed: Oct. 13, 1989

Related U.S. Application Data

[60] Continuation of Ser. No. 328,062, Mar. 23, 1989, Pat. No. 4,914,472, which is a continuation of Ser. No. 184,662, Apr. 21, 1988, which is a division of Ser. No. 95,954, Sep. 14, 1987, Pat. No. 4,831,413.

[30] Foreign Application Priority Data

Sep. 18, 1986 [JP] Japan ................................ 61-217954

[51] Int. Cl.⁵ ........................ G03G 21/00; G03B 27/32
[52] U.S. Cl. .................................... 355/309; 355/218; 355/77
[58] Field of Search ............... 355/309, 308, 218, 244, 355/77, 243, 55, 313

[56] References Cited

U.S. PATENT DOCUMENTS 4,052,054 10/1977 Cardwell et al. .
4,537,497 8/1985 Masuda .
4,575,227 3/1986 Ito et al. .
4,585,332 4/1986 Shenoy ................................ 355/243
4,595,273 6/1986 Watanabe et al. .
4,602,867 7/1986 Shimizu et al. ........................ 355/55
4,647,188 3/1987 Komiya et al. .
4,669,858 6/1987 Ito et al. .............................. 355/243
4,727,401 2/1988 Partilla et al. .

FOREIGN PATENT DOCUMENTS 60-2942 1/1985 Japan .
60-93463 5/1985 Japan .
60-84945 6/1985 Japan .
61-196263 8/1986 Japan .

*Primary Examiner*—R. L. Moses
*Attorney, Agent, or Firm*—Burns, Doane, Swecker & Mathis

[57] ABSTRACT

An automatic document feeder and a copying apparatus, for copying the respective images of two successive documents on one copying sheet.

The automatic document feeder detects whether a document fed for copying is an odd-numbered document or an even-numbered document, conveys an odd-numbered document to a first position on the contact glass, conveys an even-numbered document to a second position on the contact glass.

The copying apparatus copies the image of the odd-numbered document placed at the first position on the contact glass in one half of a copying sheet, and then stores the copying sheet carrying the image in one half thereof for the next copying operation. When an even-numbered document is placed at the second position on the contact glass by the automatic document feeder after the copying operation for copying the odd-numbered document has been completed, the copying apparatus copies the image of the even-numbered document in the other half of the same copying sheet carrying the image of the odd-numbered document in one half thereof, and discharges the copying sheet.

12 Claims, 25 Drawing Sheets

AUTOMATIC DOCUMENT FEEDER AND A COPYING APPARATUS EQUIPPED WITH SUCH AN AUTOMATIC DOCUMENT FEEDER

This application is a continuation, of application serial no. 328,062 filed Mar. 23, 1989, U.S. Pat. No. 4,919,432 which is a continuation of 184,662 filed Apr. 21, 1988 (which is a divisional of 095,954 filed Sept. 14, 1987) U.S. Pat. No. 4,831,413.

BACKGROUND OF THE INVENTION

1. Field of the Invention

The present invention relates to an automatic document feeder for automatically feeding a document to a copying apparatus and setting the document at an exposure position, and a copying apparatus equipped with such an automatic document feeder.

2. Description of the Prior Art

In copying a plurality of documents, an automatic document feeder which feeds a document automatically onto the contact glass of a copying apparatus and removes the document from the contact glass after exposure is employed to carry out the copying operation efficiently. Such an automatic document feeder is disposed near the contact glass and is operated in synchronism with the copying apparatus.

Although the conventional automatic document feeder is capable of automating the handling of documents for efficient copying operation, the conventional automatic document feeder is unable to deal with copying two documents on one copying sheet for reducing the number of copies and saving space for storing the copies, because the conventional automatic document feeder is able to set a document only at a fixed exposure position on the contact glass.

SUMMARY OF THE INVENTION

Accordingly, it is an object of the prevent invention to provide an automatic document feeder and a copying apparatus which, in combination, are able to copy two successive documents on one copying sheet.

It is another object of the present invention to provide an automatic document feeder capable of setting an odd-numbered document and an even-numbered document at different setting positions, respectively, on the contact glass of a copying apparatus.

It is a further object of the present invention to provide a copying apparatus capable of copying two documents successively set at different setting positions, respectively, on the contact glass thereof by an automatic document feeder at different positions, respectively, on one copying sheet.

The above and other objects, features and advantages of the present invention will become apparent from the following description taken in conjunction with the accompanying drawings.

DESCRIPTION OF THE PREFERRED EMBODIMENTS

The principle of present invention will be described with reference to FIG. 1 prior to the description of an automatic document feeder and a copying apparatus embodying the present invention.

Figure 1:
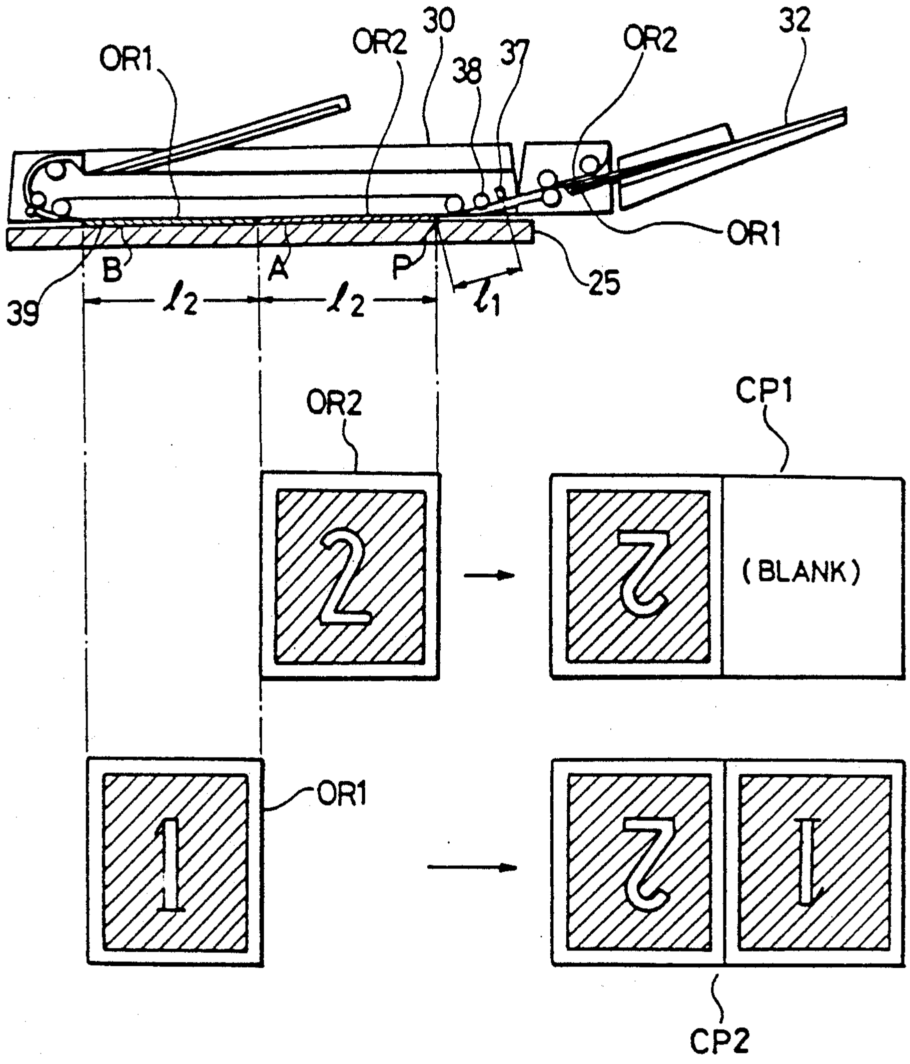
FIG. 1 is an illustration of assistance in explaining the manner of operation of an automatic document feeder, in a preferred embodiment, according to the present invention.

Referring to FIG. 1, in an automatic document feeder (ADF) 30, documents OR1 and OR2 are stacked in the order of the documents OR1 and OR2 on a tray 32 with the respective sides thereof to be copied facing the bottom of the tray 32. The copying apparatus is set for a composite copy mode. Then, the documents OR1 and OR2 are fed successively in the order of OR2 and OR1 to a position immediately before a pinch roller 38 by a feed roller. When a command to convey the documents onto the contact glass is provided by the CPU of a control unit which controls the operation of the automatic document feeder, a conveying mechanism including the pinch roller and a conveyor belt delivers the documents to the contact glass 25. The first document (an odd-numbered document), in this case, the document OR2, is delivered first to the contact glass. Upon the detection of the trailing edge of the first documents, a feed detector 37 provides a detection signal and the counter of the CPU counts the number of the document. The CPU discriminates the first document with respect to the order of feed and controls the feed mechanism to stop the first document, namely, the odd-numbered document OR2, at a position A after conveying the same by a distance $l_1$ from the feed detector 37. The document OR2 is subjected to exposure at the position A for copying to produce a copy CP1, in which the half of the copying sheet remains blank. In the composite copy mode, the copy CP1 is stored in an intermediate tray to subject the CP1 to further copying operation. After a required number of copies of the document OR2 have been produced, the document OR1 is fed onto the contact glass. Upon the detection of the trailing edge of the document OR1 by the feed detector 37, the CPU discriminates the document OR1 to be the second document, namely, an even-numbered document, and controls the feed mechanism to convey the document OR1 by a distance $l_1+l_2$ ($l_1$=the fixed distance, and $l_2$=the length of the document) so that the document OR1 is placed at a position B. Then, the document OR1 is subjected to exposure to copy the document OR1 on the copying sheet carrying the copy of the document OR2 to provide a copy CP2. Thus, an odd-numbered document and an even-numbered document are copied in two pages, respectively, on the same copying sheet. The copies are formed side by side successively in a paper feed direction, as can be seen from CP1 and CP2. Such a document feeding operation is controlled in accordance with a control program by the CPU.

Figure 2:
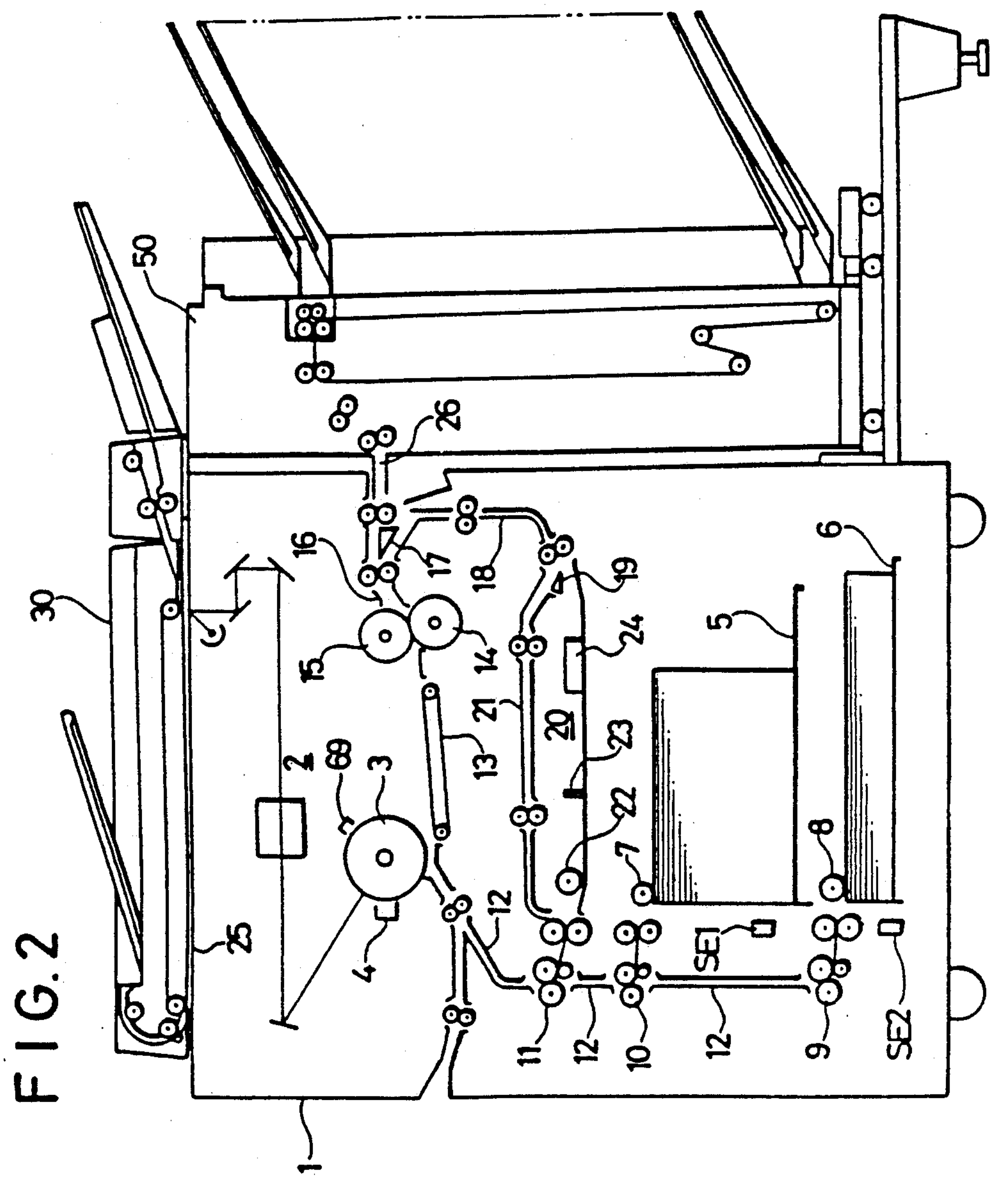
FIG. 2 is a schematic sectional side elevation showing the essential constitution of a copying apparatus.

Referring to FIG. 2, there is shown a copying apparatus 1 which comprises an optical scanning system 2, a photosensitive drum 3, a developing unit 4, a first sheet feeding table 5, a second sheet feeding table 6, feed rollers 7 and 8 for feeding copying sheets stacked on the first sheet feeding table 5 and the second sheet feeding table 6, respectively, one at a time, detectors SE1 and SE2 for detecting the size of the copying sheet stacked o the first sheet feeding table 5 and on the second sheet feeding table 6, respectively, conveyor rollers 9, 10 and 11 for conveying a copying sheet to an image transfer position, a first sheet conveying passage 12, a conveyor belt 13 for conveying a copying sheet carrying a toner image, a pair of fixing rollers 14 and 15, an eraser 69, a second sheet conveying passage 16 for conveying a copying sheet carrying a fixed image, an intermediate tray 20 for temporarily storing a copying sheet for the following composite copying operation, a first guide member 17 for selectively guiding a copying sheet into a third sheet conveying passage 26 for discharging a copying sheet or into a fourth sheet conveying passage 18 leading to the intermediate tray 20, a second guide member 19 for guiding a copying sheet directly into the intermediate tray 20 in the composite copying mode or for guiding a copying sheet into an inverting passage 21 which conveys a copying sheet into the intermediate tray 20 after inverting the copying sheet in the two-side copying mode, a feed roller 22 for feeding the copying sheet stored in the intermediate tray 20 to the copying unit, guide plates 23 and 24 provided on the intermediate tray which are set at appropriate positions, respectively, according to the size of the copying sheet, and are adapted to move the feed roller 22 up upon the storage of copying sheets of a number corresponding to the number of copies specified by means of data input keys in the intermediate tray 20 and to move the pile of the copying sheet under the feed roller 22 to make the copying sheets ready for feeding, the automatic document feeder 30, which will be described afterward, mounted on the contact glass 25 of the copying apparatus 1, and a sorter 50 of a known construction.

Figure 3:
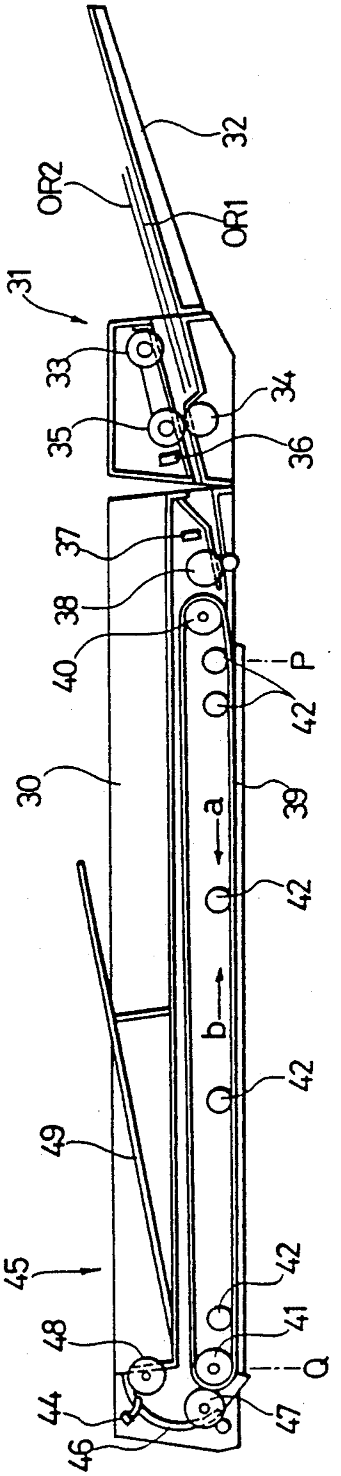
FIG. 3 is a sectional side elevation showing the essential constitution of the automatic document feeder of FIG. 1.

Referring to FIG. 3, the automatic document feeder 30 comprises a document feeding unit 31, a document tray 32, a feed roller 33, separating rollers 34 and 35 for separating documents so that the documents are fed one at a time, a document separation detector 36 for detecting the perfect separation of the documents, the feed detector 37 for detecting the passage of the trailing edge of a copying sheet to position the copying sheet at a predetermined position, a driving roller 40, a tension roller 41, a conveyor belt 39 extended between the driving roller 40 and the tension roller 41, pressure rollers 42 pressing the conveyor belt 39 against the contact glass, a document discharging unit 45, a document discharge guide 46, a guide rollers 47 and 48, a document receiving tray 49 for storing discharged documents, and a discharge detector 44 which detects the trailing edge of a discharged document.

Figure 4:
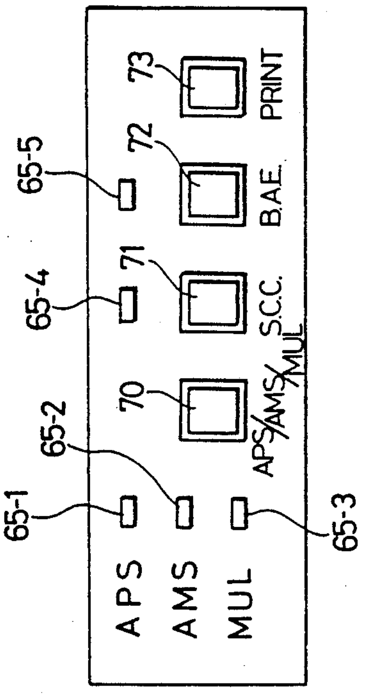
FIG. 4 is a front elevation of the control panel of the automatic document feeder of FIG. 1.

Referring to FIG. 4, a control panel has a print start key 73, a boundary erasing key 72 to give a command to erase an image remaining in a boundary area on the photosensitive drum corresponding to a boundary space between two successive documents, a second composite copy mode key 71 for selecting a second composite copying mode, a mode selector key 70 for selecting an APS mode in which copying sheets of a suitable size are selected automatically on the basis the size of documents to be copied and a selected copying magnification, an AMS mode in which a suitable magnification is selected automatically on the basis of the size of copying sheet to be used and the size of documents to be copied or a MUL mode for manually selecting copying sheets to be used and a magnification in which the documents are to be copied, and pilot lamps 65-1, 65-2, 65-3, 65-4 and 65-5 respectively for indicating selected operating modes. The composite copying mode includes a first composite copying mode and second composite copying mode. The first composite copying mode is an ordinary composite copying mode in which a document is copied in the blank of a copying sheet carrying the image of another document. The second composite copying mode is a copying mode to which the present invention pertains, in which two successively fed documents are copied on a single copying sheet by a copying system incorporating the automatic document feeder.

The manner of operation of the copying system, namely, the copying machine equipped with the automatic document feeder of the present invention, will be described hereinafter.

When the APS mode is selected in a copying mode other than the second composite copying mode, a copying sheet having a size corresponding to the size of a copied image, namely, the product of a document size and a copying magnification, is selected automatically. For example, when the document size is A4 and the copying magnification is 1.00, a copying sheet having the size "A4" is selected automatically.

When the AMS mode is selected in a copying mode other than the second composite copying mode, a copying magnification to copy a document in a copied image having a size corresponding to the size of a selected copying sheet is selected automatically. For example, when the document size is A4 and the size of a selected copying sheet is B5, a copying magnification of 0.860 is selected automatically.

When the MUL mode is selected in a copying mode other than the second composite copying mode, a copying sheet of an optional size and an optional copying magnification can be selected by the operator.

When the APS mode is selected in the second composite copying mode, a copying sheet having a size twice the size of a copied image, namely, a size twice the product of a document size and a magnification, is selected automatically. For example, when the document size is A4 and the copying magnification is 1.000, a copying sheet having the size A3 is selected automatically.

When the AMS mode is selected in the second composite copying mode, a magnification to copy a document in a size half the size of a copying sheet is selected automatically. For example, when the document size is A4 and the size of the copying sheet is A4, a magnification of 0.707 is selected automatically.

When the MUL mode is selected in the second composite copying mode, a copying sheet having a size A4 is selected and the optical system is set for a copying magnification of 0.707.

Paper sizes A3, A4, B4 and B5 used in this specification to denote the size of copying sheets are standard paper sizes specified in Japanese Industrial Standards; size A3=420 mm×297 mm, size A4=297 mm×210 mm, size B4=364 mm×247 mm, and size B5=257 mm×182 mm.

The mode of copying operation of the copying system will be described hereinafter with reference to the copying operation in the second composite copying mode and the APS mode (document size: A4, copying magnification: 1.00), by way of example.

First, the keys 70 and 71 are operated to select the second composite copying mode and the APS mode, and a magnification selecting key, not shown, is operated to set the optical system for a magnification 1.00.

Documents having the size A4 are stacked in the document tray 32 of the automatic document feeder with their surfaces carrying images down in order of page so that the document of the last page is fed first.

The print start key 73 on the control panel is pressed to start the copying operation. Then, the feed roller 33 feeds the top document OR. If a plurality of documents are fed simultaneously, the document separating rollers 34 and 35 separates the documents to feed the documents one at a time. First, the first document OR2 (an odd-numbered document) is fed to the pinch roller 38. The timing of operation of the pinch roller 38 is controlled by a known timing control means. The pinch roller 38 is actuated at a suitable time to feed the document OR2 under the conveyor belt 39. The conveyor belt 39 is driven by the driving roller 40 so that the lower run thereof moves in the normal feed direction indicated by an arrow a. Therefore, the document OR2 is conveyed in the direction indicated by the arrow a by the frictional force of the conveyor belt 39.

A pulse generating disk, not shown, for generating pulses is attached to the output shaft of a motor for driving the pinch roller 38. A predetermined time is measured by the pulse generating disk after the trailing edge of the document OR2 has passed the feed detector 37. Upon the passage of the trailing edge of the document by a reference point P (a position at a distance $l_1$ in the feed direction from the feed detector 37), the pinch roller 38 and the conveyor belt 39 are stopped, and then the conveyor belt 39 is turned in the opposite direction through a distance decided on the basis of a time and distance defined by the timer to position the document at a predetermined first position A (FIG. 1) with the trailing edge thereof in coincidence with the point P.

After the document has been positioned at the first position A, the automatic document feeder commands the copying machine to execute a series of operations for exposure, developing and fixing. Then, the optical scanning system 2 scans the document to form an electrostatic latent image on the circumference of the photosensitive drum 3. The electrostatic latent image is developed in a toner image, and then the toner image is transferred to a copying sheet of the size A3, which has been fed to the transfer section through the first sheet conveying passage 12 by the conveyor rollers 9, 10 and 11, in the front half area thereof. The copying sheet carrying the toner image is conveyed by the conveyor belt 13 to the fixing roller 14 and 15 to fix the toner image on the copying sheet. The foregoing copying procedures are the same as ordinary copying procedures and, naturally, the copying machine is equipped with ordinary necessary devices such as a charger, a transfer charger, a static electricity eliminator and cleaning device, the description of which will be omitted herein because those devices are of known constitution.

After the toner image has been fixed by the fixing rollers 14 and 15, the copying sheet is guided into the fourth sheet conveying passage 18 by the first guide member 17. In the two-side copying mode, the second guide member 19 is positioned so as to guide the copying sheet into the inverting passage to invert the copying sheet. In the first and second composite copying modes, the second guide member 19 is positioned so as to guide the copying sheet into the intermediate tray 20. In this case, since the second composite copying mode is selected, the second guide member 19 guides the copying sheet directly into the intermediate tray 20. The copying sheet is positioned at a predetermined position in the intermediate tray 20 by means of the guide plates 23 and 24. The foregoing copying cycle is repeated by the number of times corresponding to the required number of copies of the first document, namely, the odd-numbered document.

Then, the feed roller 22 placed on the intermediate tray 20 is raised, and then the stack of the copying sheets stacked on the intermediate tray 20 is moved to the left, as viewed in FIG. 3, to position the stack of the copying sheets at a feed position. Then, the feed roller 22 is lowered onto the stack of the copying sheets to feed the feed the copying sheets stored in the intermediate tray 20 for copying the second document in the blanks thereof.

Upon the reception of a copying operation end signal indicating the completion of the process of copying the first document (odd-numbered document) from the copying apparatus, the automatic document feeder starts a document changing operation. First, the conveyor belt 39 is driven so that the lower run thereof moves in the normal feed direction indicated by the arrow a in FIG. 3 to discharge the first document (odd-numbered document) past the document discharge guide 46 and the guide rollers 47 and 48 into the document receiving tray 49. The discharge of the document is detected by the discharge detector 44. Then, the next document, namely, the second document (even-numbered document) is fed by the feed roller 33. The timer starts measuring time after the detection of the trailing edge of the second document by the feed detector 37 and regulates the duration of operation of the conveyor belt 39 so that the document is positioned at a predetermined second position B (FIG. 1), in which the trailing edge of the second document is positioned at a position at a distance $l_1+l_2$ from the feed detector 37 (FIG. 1) as shown in FIG. 3.

Then, the automatic document feeder commands the copying machine to execute a series of operations for exposure, developing and fixing. The optical scanning system 2 scans the document to form an electrostatic latent image on the circumference of the photosensitive drum. Since the optical canning system 2 scans the entire scanning area on the contact glass, the electrostatic latent image of stain and foul spots on the conveyor belt 39 of the automatic document feeder in an area corresponding to the first position A on the contact glass also is formed on the circumference of the photosensitive drum. The electrostatic latent image of the stain and the foul spots are erased by the eraser lamp. Since a linear image is formed in the boundary area between the respective images of the first document (odd-numbered document) and the second document (even-numbered document) in some cases, it is preferable to erase the linear image by the eraser lamp. Then, the electrostatic latent image formed on the photosensitive drum is developed in a toner image, and the toner image is transferred to the blank part of the copying paper carrying the fixed toner image of the first document fed from the intermediate tray 20 by the feed roller 22. The copying paper carrying the fixed toner image of the first document and the toner image of the second document is conveyed to the fixing rollers 14 and 15 by the conveyor belt 13 to fix the toner image of the second document thereon. In this copying cycle for copying the second document, the first guide member 17 is positioned so as to guide the copying paper through the second sheet conveying passage 16 into the sorter 50. Accordingly, the copying sheet is delivered to the sorter 50, where the copying sheet is subjected to a known sorting operation. This copying cycle is repeated by the number of times corresponding to the required number of copies of the second document (even-numbered document).

The copying cycles for copying the first document (odd-numbered document) and the copying cycles for copying the second document (even-numbered document) are repeated alternately for copying the rest of the document to copy all the documents.

The discrimination between the odd-numbered documents and the even-numbered documents is achieved on the basis of the count of signals provided by the feed detector 37 upon the detection of the respective trailing edges of the documents counted by the internal counter of the CPU 60 of the control unit of the automatic document feeder.

Figure 5:
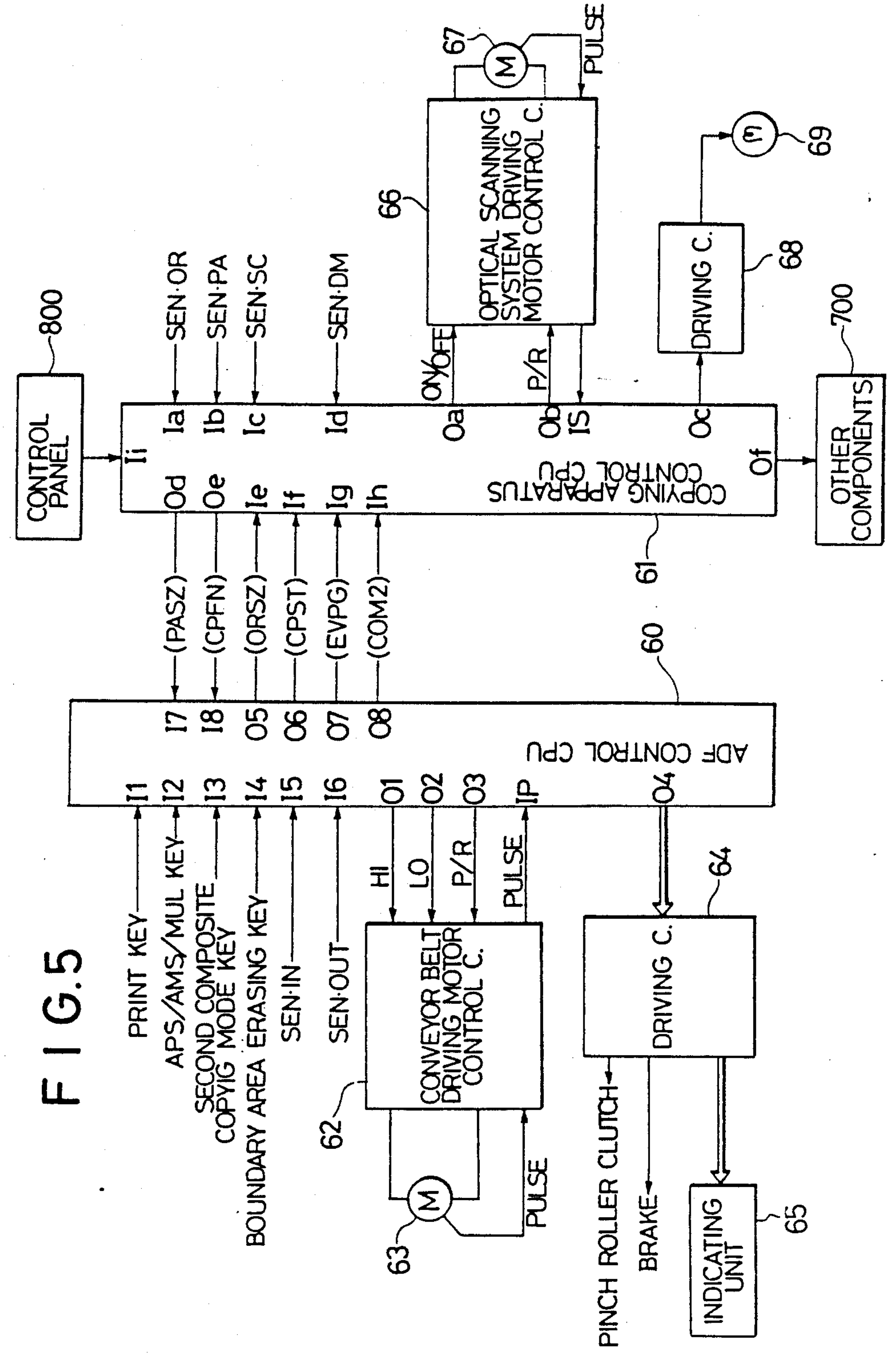
FIG. 5 is a block diagram of a control unit for controlling the automatic document feeder of FIG. 1 and the copying of 2.

Referring now to FIG. 5 showing, in a block diagram, an automatic document feeder control unit for controlling the automatic document feeder and a copying apparatus control unit for controlling the copying apparatus, the automatic document feeder control unit has the CPU 60 and the copying apparatus control unit has a CPU 61. The CPUs 60 and 61 control the operations of the automatic document feeder and the copying apparatus, respectively, according to control programs.

The CPU 60 of the automatic document feeder control unit has an input port I1 connected to the print start key 72, an input port I2 connected to the mode selector key 70 for selecting the APS mode, the AMS mode or the MUL mode an input port I3 connected to the second composite copying mode key 71, an input port I4 connected to the boundary area erase key 72, an input port I5 connected to the feed detector 37 to receive a signal SEN-IN, and an input port I6 connected to the discharge detector 44 to receive a signal SEN-OUT. A high-speed drive signal HI, a low-speed drive signal LO and a positive reverse signal are given through output ports 01, 02 and 03, respectively, to a conveyor driving motor control circuit 62. The driving speed and direction of rotation of the output shaft of a conveyor belt driving motor 63 are controlled by the conveyor belt driving motor control circuit 62. Pulse signals generated by the pulse generator provided on the output shaft of the conveyor belt driving motor 63 are applied through the control circuit 62 to the input port IP of the ADF control CPU 60. Clutch control signals for controlling a clutch for transmitting power to the pinch roller, brake operating signals and signals indicating the APS mode, the AMS mode, the MUL mode and the second composite copying mode selected by means of the selector keys are given through the output port 04 of the ADF control CPU 60 to a driving circuit 64 to control the clutch and the brake, and to light up the pilot lamps of an indicating unit 65.

Detection signals SEN-OR indicating the sizes, such as A4 and B5, and positions, such as lengthwise position and sidewise position, of documents detected by a document size-position detector, copying sheet size signals SEN-PA, a scanning end signal SEN-SC indicating the end of scanning operation of the optical scanning system, and a phase signal SEN-DM indicating the angular phase of the photosensitive drum are applied to the input ports Ia, Ib, Ic and Id of the copying apparatus control CPU 61. The CPU 61 gives an optical scanning system driving signal and a driving direction change signal through the output ports Oa and Ob thereof to an optical scanning system driving motor control circuit 66 for controlling the operation of an optical scanning system driving motor 67 to start, stop and positive reverse the optical scanning system driving motor 67. The CPU 61 receives pulse signals generated by a pulse generator provided on the output shaft of the optical scanning system driving motor 67 from the optical scanning system driving motor control circuit 66 through the input port IS thereof. The CPU 61 gives an erasing lamp control signal for controlling the erasing lamp 69 through the output port Oc thereof to a driving circuit 68, and gives control signals for controlling the other components 700 of the copying apparatus through the output port Of thereof.

Control signals are transmitted between the ADF control CPU 60 and the copying apparatus control CPU 61. The ADF control CPU 61 applies a document size signal ORSZ, a copy start signal CPST, an even-numbered document signal EVPG indicating that an even-numbered document is in the copying process, and a second composite copying mode signal COM2 indicating that the second composite copying mode is selected through the output ports 05, 06, 07 and 08 thereof to the input ports Ie, If, Ig and Ih, respectively, of the copying apparatus control CPU 61. The copying apparatus control CPU 61 applies a copying sheet size signal PASZ and a copy end signal CPEN through the output ports Od and Oe thereof to the input ports 17 and 18 of the ADF control CPU 60. Input data entered by means of the keys of the control panel 800 of the copying apparatus are applied to the input port Ii of the copying apparatus control CPU 61.

Control procedures to be executed by the ADF control CPU 60 and the copying apparatus control CPU 61 will be described hereinafter with reference to flow charts shown in FIGS. 6 through 13.

Figure 6A:
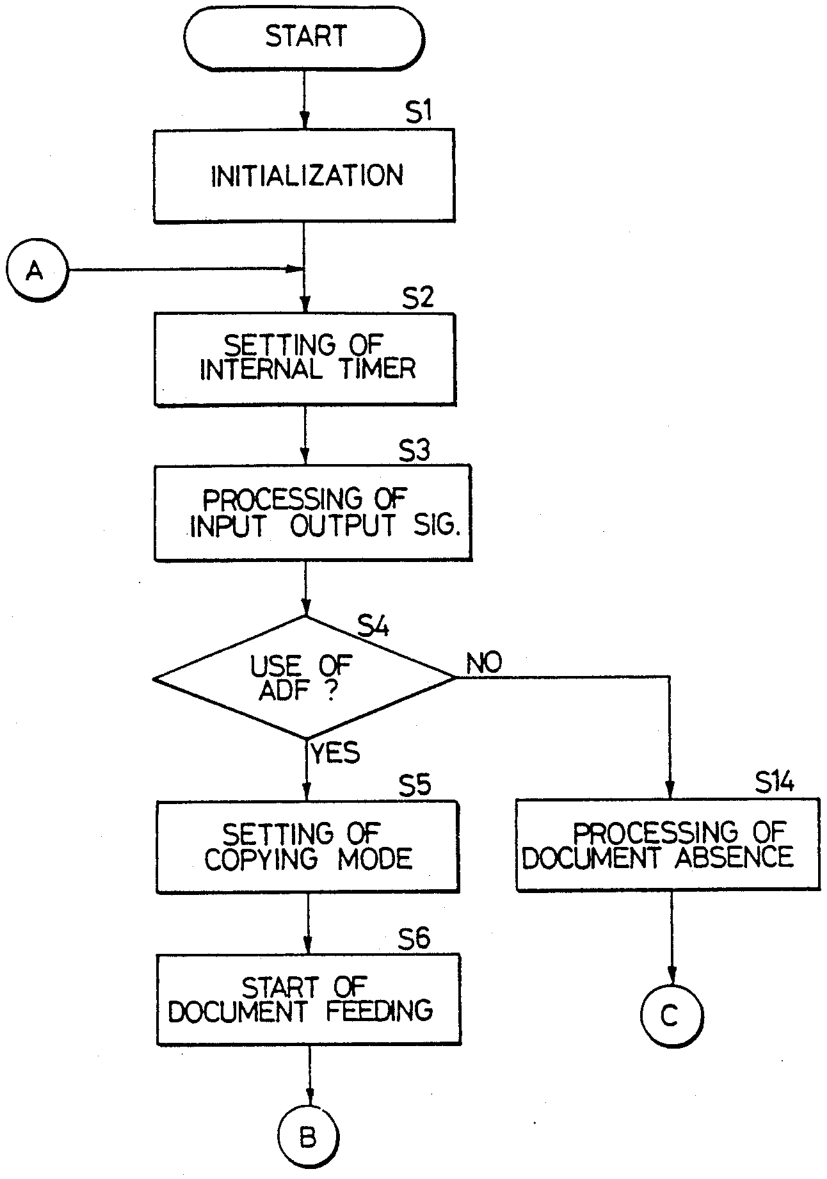
FIGS. 6 to 13 are flow charts of control programs to be executed by the central processing unit (hereinafter abbreviated to "CPU") of the control unit of FIG. 5 to control the respective operations of the automatic document feeder of FIG. 1 and the copying apparatus of FIG. 2.
Figure 6B:
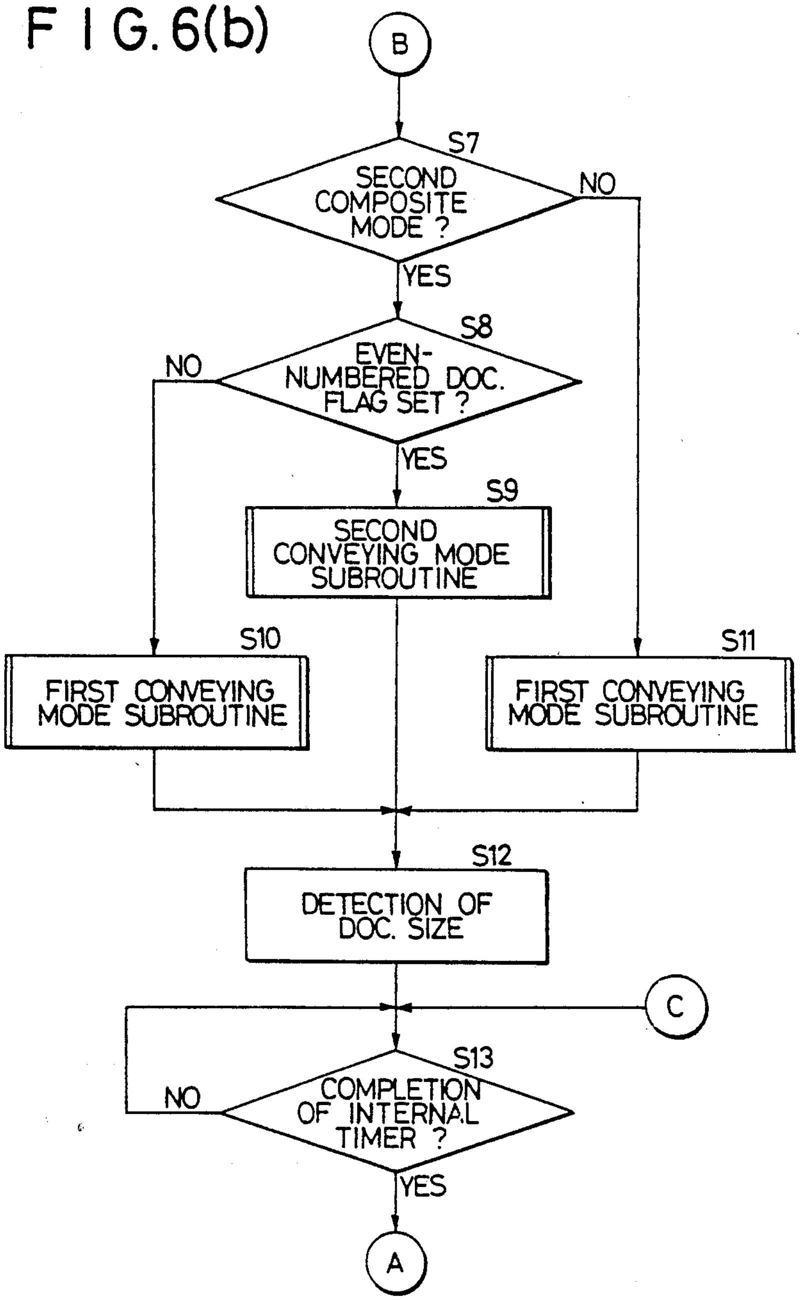
Figure 7A:
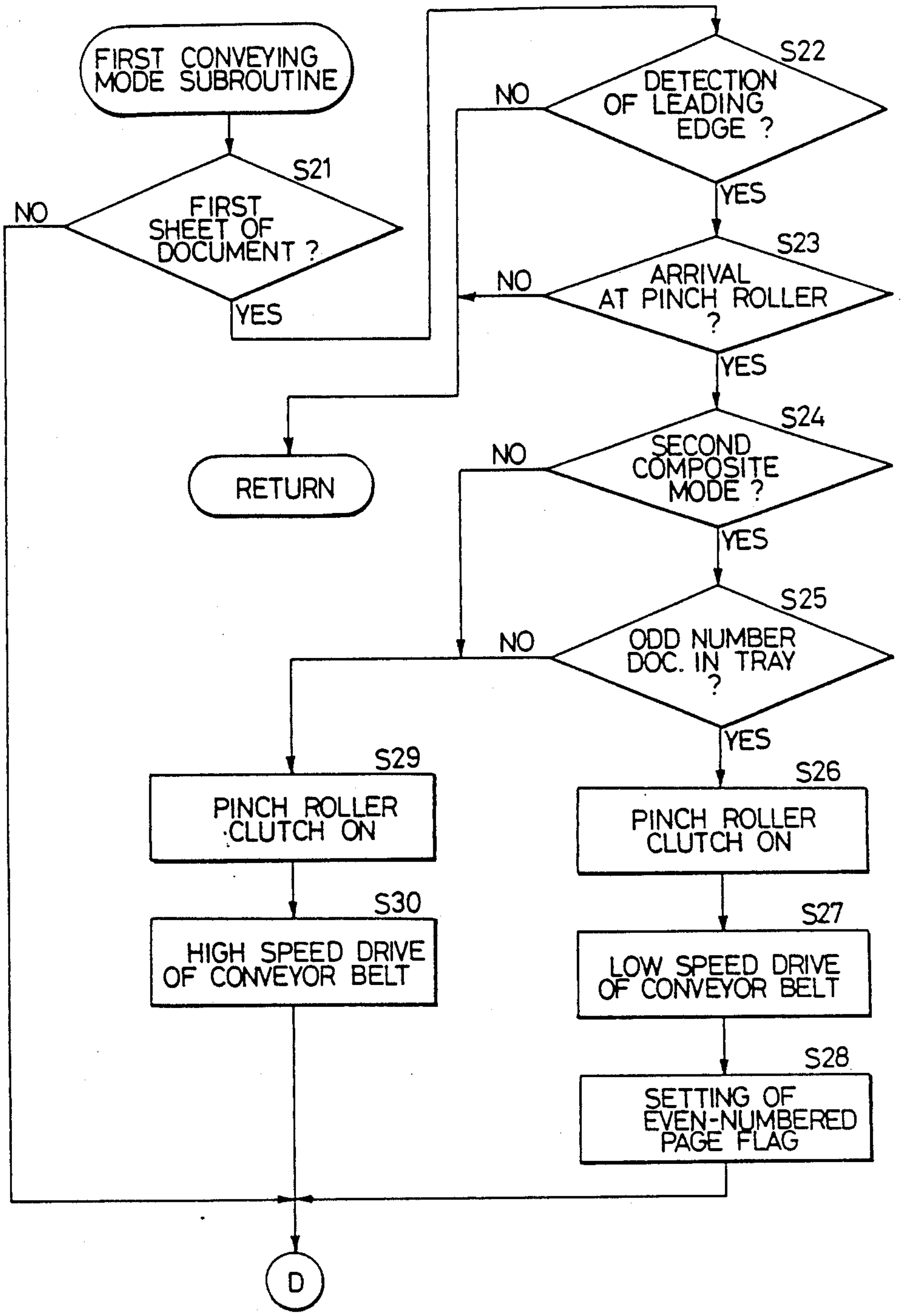
Figure 7B:
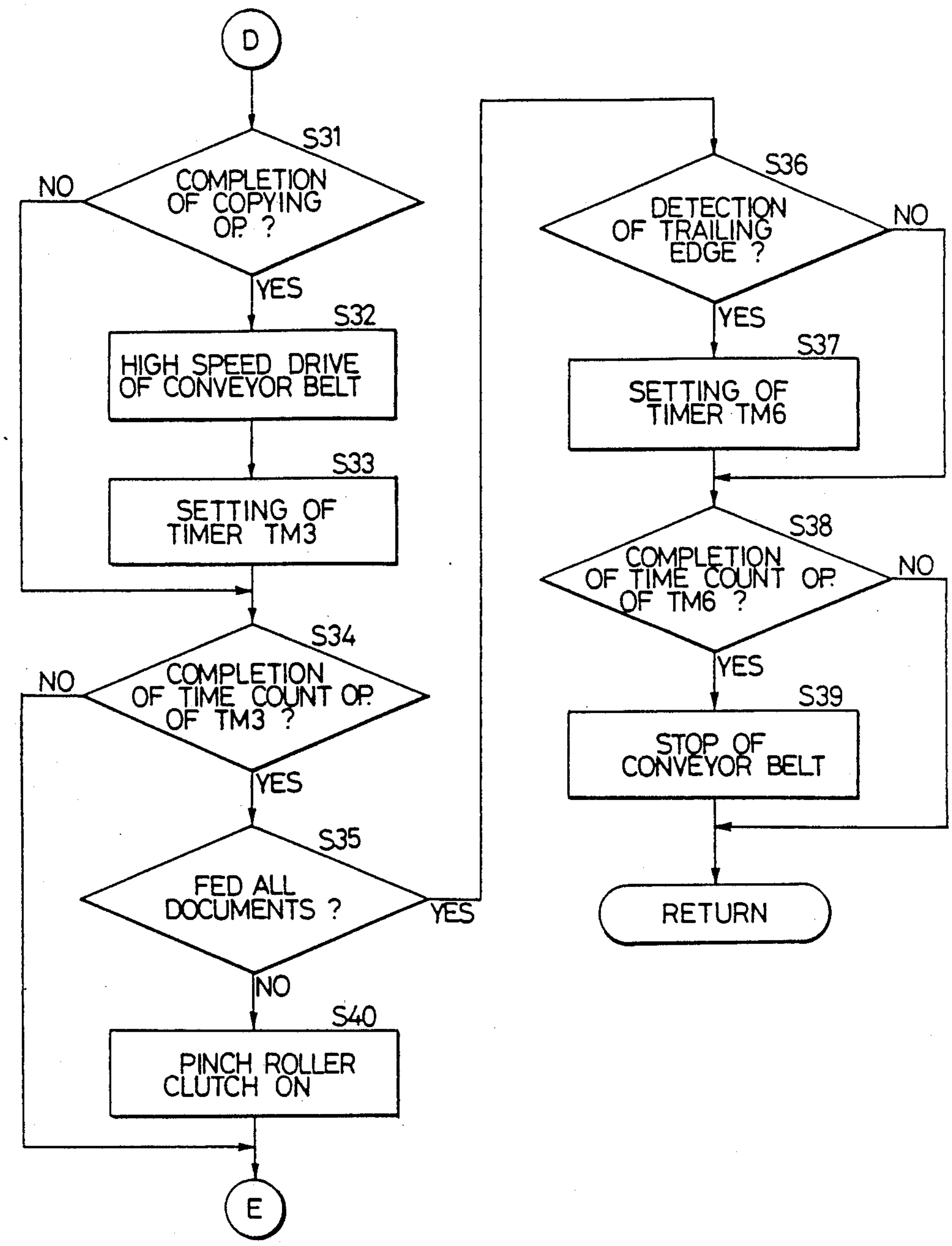
Figure 7C:
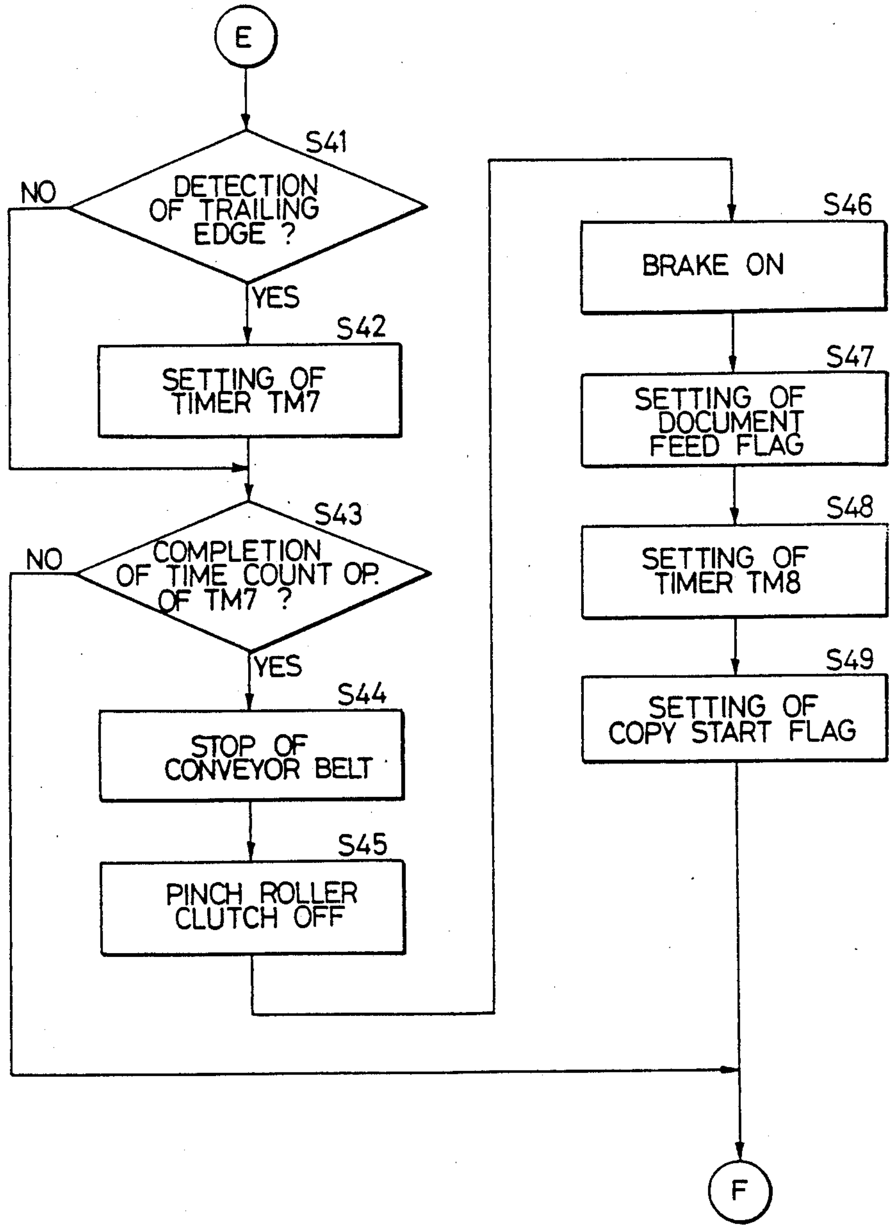
Figure 7D:
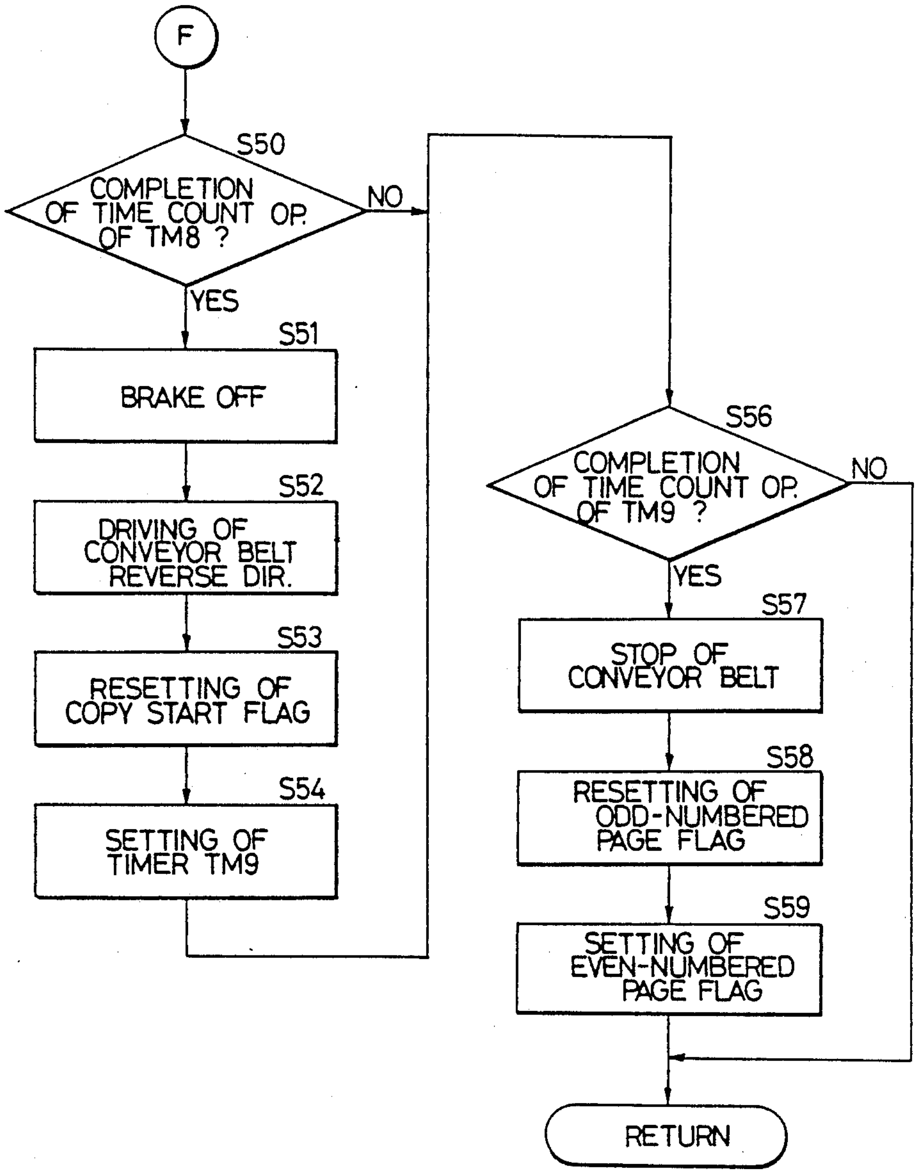

FIG. 6 is a flow chart showing the general steps of a main routine for controlling the automatic document feeder. Upon the connection of the automatic document feeder to a power source, the memories are cleared and flags are reset to initialize the ADF control CPU 60 in step S1. An internal timer for controlling the operation of the ADF control CPU 60 is set in step S2. Input signals provided by the detectors and output signals such as a driving motor start command signal are processed in step S3. In step S4, a decision is made whether the automatic document feeder is to be used or not. When the decision in step S4 is "Yes", set the copying mode corresponding to an input signal indicating a selected copying mode such as the normal copying mode or the composite copying mode in step S5. The document feeding operation is started to feed a document to and to stop the same at the pinch roller in step S6.

In step S7, a decision is made whether or not the second composite copying mode is selected. When the decision in step S7 is "No", the routine goes to step S11 to execute a first conveying mode subroutine, which will be described hereinafter, and then the routine goes to step S12. When the decision in step S7 is "Yes", the routine goes to step S8, where a decision is made whether or not a flag indicating the feed of an even-numbered document is set. When the decision in step S8 is "Yes", a second conveying mode subroutine is executed in step S9, and then the routine goes to step S12. When the decision in step S8 is "No", the first conveying mode subroutine is executed in step S1O, and then the routine goes to step S12.

In step S12, the document size is decided from a keyboard entry data or a document size detection signal provided by a detector. In step S13, a decision is made whether or not a time count operation by the internal timer has completed. When the decision in step S13 is "Yes", the routine returns the step S2 to repeat the main routine.

When the decision in step S4 is "No", a document absence procedure, such as a procedure for indicating the absence of documents on the contact glass 25, is executed at step S14, and then the routine goes to step S13.

The first conveying mode subroutine (steps S10 and S11) and the second conveying mode subroutine (step S9) will be described hereinafter.

First, the first conveying mode subroutine will be described with reference to FIG. 7. A decision is made in step S21 whether or not the document is the first sheet on the basis of the count of documents counted by a document counter, not shown. When the decision ion step S21 is "No", the routine goes to step S31, and when "Yes", a decision is made in step S22 whether or not the feed detector 37 has detected the leading edge of the document. When the decision in step S22 is "Yes", a decision is made in step S23 whether or not the leading edge of the document has arrived at the pinch roller. When the decision in step S23 is "Yes", the routine goes to step S24. When the decisions in steps S22 and S23 are "No", the routine returns to the main routine In step S24, a decision is made whether or not the second composite copying mode is selected When the decision in step S24 is "Yes", the routine goes to step S25 and, when "No", the routine goes to step S29.

In step S25, a decision is made whether or not the number of the documents stacked in the document tray is an odd number. When the number is odd, the last document is copied in the right-hand half of a copying sheet in the state of CP 1 in FIG. 1. Since such a page format is not preferable, the copying operation is controlled so as to copy the last document in the left-hand half of a copying sheet and to leave the right-hand half of the same in a blank when the number of the documents is an odd number. The number of documents stacked in the document tray may be given by document number input means, for example, keys provided on the control panel.

When the decision in step S25 is "Yes", the clutch connected to the pitch roller is engaged and the conveyor belt 39 is driven at a low speed to convey the document to the position B (FIG. 1 on the contact glass 25 and an even-numbered page flag is set (steps S26, S27 and S28). When the decision in step S25 is "No", the clutch connected to the pinch roller is engaged and the conveyor belt 39 is driven at a high speed to position the document at the position A (FIG. 1 on the contact glass 25 (steps S29 and S30).

In step S31, a decision is made whether or not the copying operation for the document has been completed. When the decision in step S31 is "Yes", the conveyor belt 39 is driven at a high speed to convey the document to the document discharging unit 45 in step S32, and then a timer TM3 for timing the feed of the next document is set in step S33. When the decision in step S31 is "No", the routine jumps to step S34. In step S34, a decision is made whether or not the time count operation of the timer TM3 has been completed. When the decision in step S34 is "No", the routine goes to step S41 and, when "Yes", the routine goes to step S35, where a decision is made whether or not all the documents stacked in the document tray have been fed. When the decision in step S35 is "Yes", a decision is made in step S36 whether or not the discharge detector 44 of the document discharging unit 45 has detected the trailing edge of the document. When the decision in step S36 is "Yes", a timer TM6 for determining a time interval necessary for completely receiving the document in the document receiving tray 49 is set in step S37. In step S38, a decision is made whether or not the timer TM6 has been completed. When the decision in step S38 is "Yes", the conveyor belt 39 is stopped in step S39, and then the routine returns to the main routine. When the decision in step S36 is "No", step S37 is skipped. When the decision in step S38 is "No", step S39 is skipped.

When the decision in step S35 is "No", the clutch connected to the pinch roller is engaged to feed the document in step S40. In step S41, a decision is made whether or not the feed detector 37 has detected the trailing edge of the document. When the decision in step S41 is "Yes", a timer TM7 for determining a time interval necessary for conveying the document to the predetermined position on the contact glass 25 is set in step S42. When the decision in step S41 is "No", step S42 is skipped.

In step S43, a decision is made whether or not the time count operation of the timer TM7 has been completed. When the decision in step S43 is "No", the routine goes to step S50 and, when "Yes", steps S44, S45 and S46 are executed to stop the document feeding mechanism, namely, to stop the conveyor belt 39, to disengage the clutch connected to the pinch roller and to apply the brake, and a document feed flag is set in step S47 to feed the next document to the pinch roller 38. In step S48, a timer TM8 for determining a time interval necessary for moving the document which has been stopped at a position slightly beyond the correct position, namely, the position where the trailing edge of the document is at the point P, to the correct position by reversing the conveyor belt 39, and then a copy start flag is set in step S49.

In step S50, a decision is made whether or not the time count operation of the timer TM8 has been completed. When the decision in step S50 is "Yes", the brake braking the conveyor belt 39 is released, the conveyor belt 39 is driven in the reverse direction, the copy start flag is reset, and then a timer TM9 for determining a time interval for which the conveyor belt 39 is to be driven in the reverse direction is set in steps S51, S52, S53 and S54. The time interval for which the conveyor belt 39 is to be driven in the reverse direction is determined on the basis of the distance of conveyance of the document beyond the correct position measured by counting pulse signals generated by the pulse generator provided on the pinch roller driving shaft.

In step S56, a decision is made whether or not the time count operation of the timer TM9 has been completed. When the decision in step S56 is "Yes", namely, when the document is positioned at the correct position, the reverse movement of the conveyor belt 39 is stopped, an odd-numbered page flag is reset, an even-numbered page flag is set in steps S57, S58 and S59, respectively, and then the routine returns to the main routine.

When the decision in step S50 is "No", the routine jumps to step S56 skipping steps S51 to S54. When the decision in step S56 is "No", the routine returns immediately to the main routine skipping steps S57 to S59.

Figure 8A:
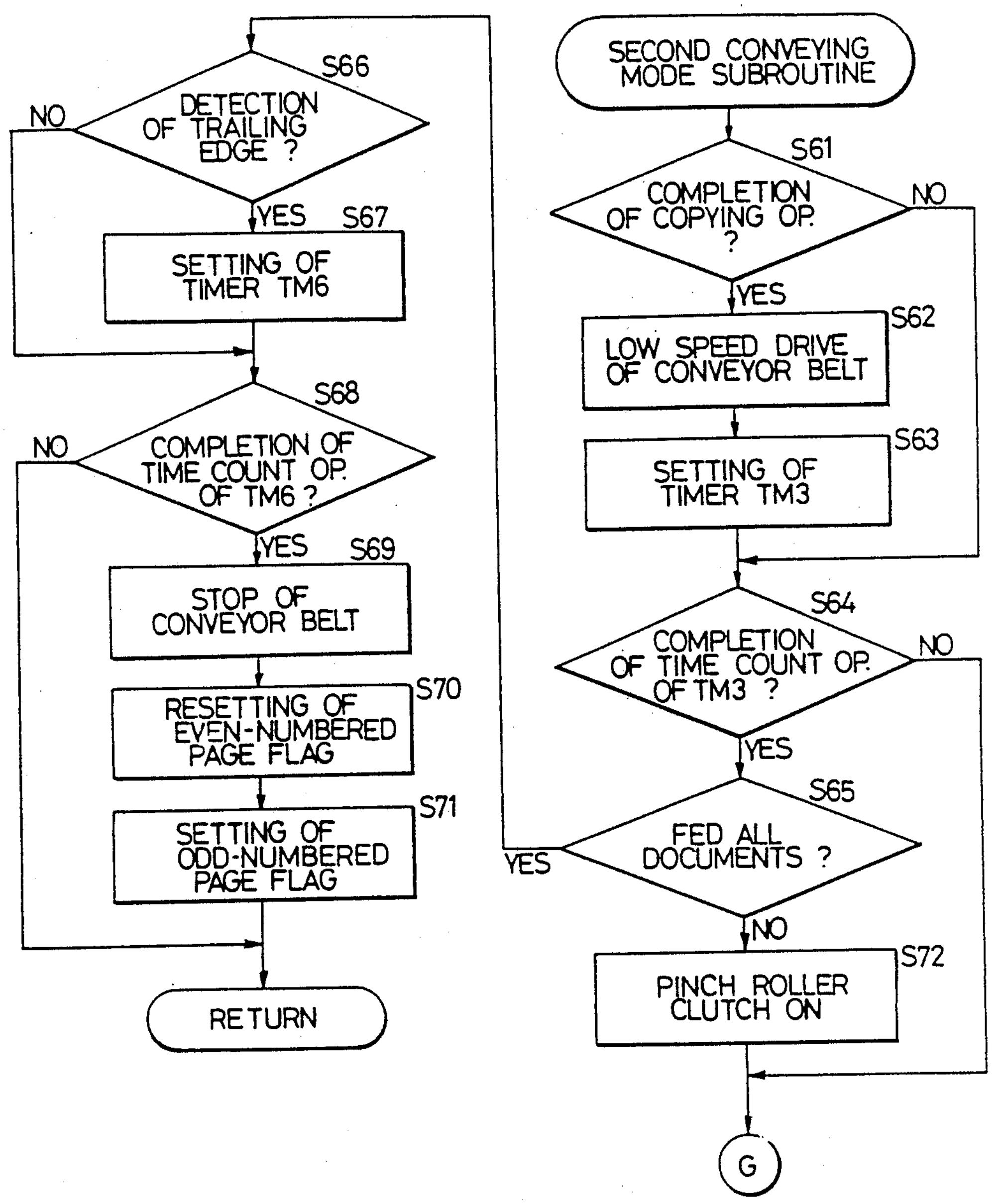
Figure 8B:
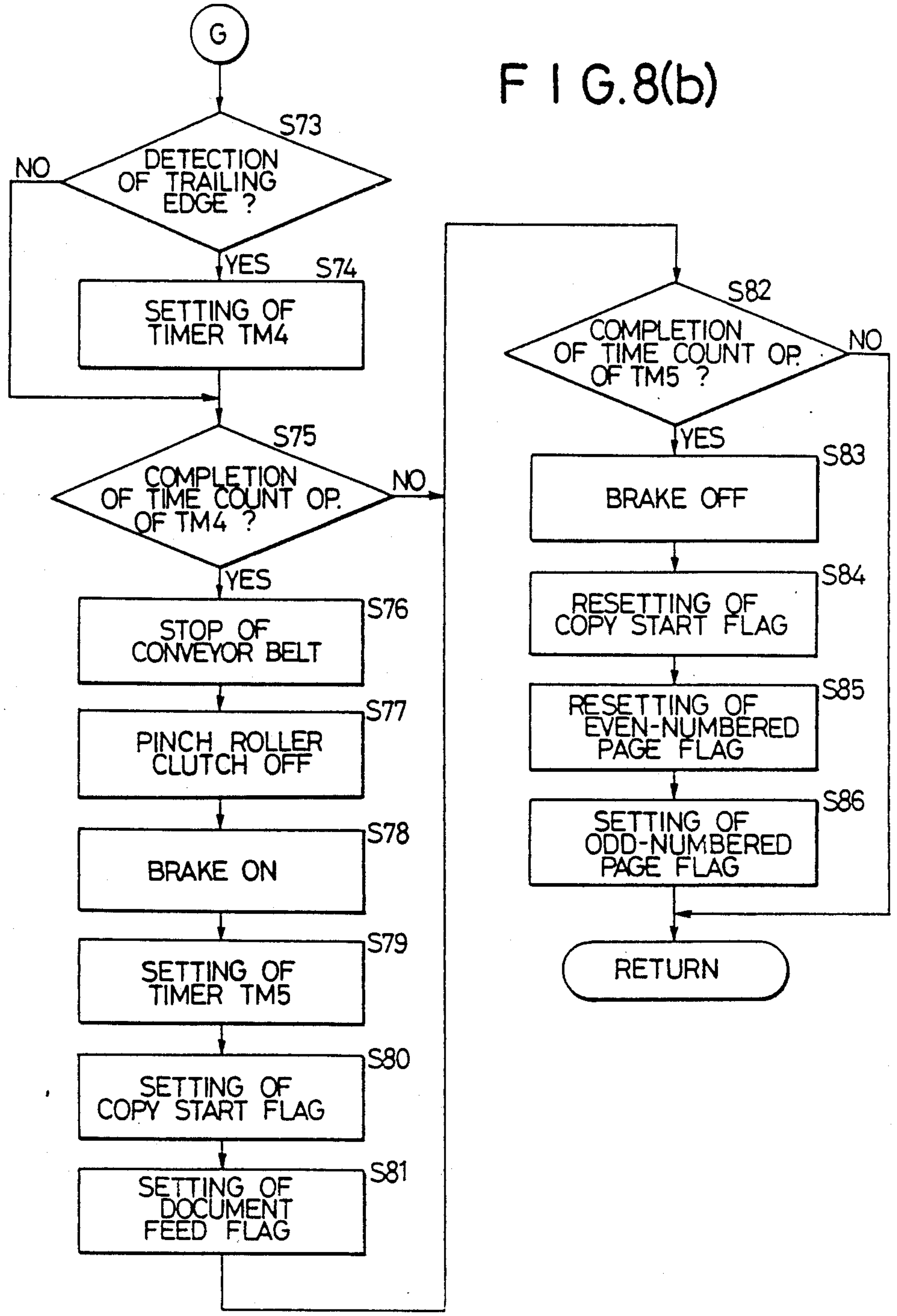

The second conveying mode subroutine will be described hereinafter with reference to FIG. 8.

First, a decision is made in step S61 whether or not the copying operation for a document has been completed. When the decision in step S61 is "yes", the conveyor belt 39 is driven at a low speed to discharge the document into the document discharging unit 45 in step S62, and then the timer TM3 for timing the feed of the next document is set in step S63.

The reason for driving the conveyor belt 39 at a low speed will be explained hereinafter. The first document is stopped at the position A (FIG. 1) with the trailing edge thereof at the reference point P. Since the reference point P is at one end of the contact glass, the reference point P can be determined by a positioning member. Therefore, the conveyor belt 39 is driven at a high speed to feed the first document.

On the other hand, when a document is stopped at the position B (FIG. 1 , the position of the trailing edge of the document is dependent on the size of the document and hence it is difficult to determine the position of the trailing edge of the document by a positioning member. Therefore, the conveyor belt 39 is driven at a low speed to stop the document accurately at the position B. In this embodiment, the high speed is 1000 mm/sec and the low speed is 200 mm/sec.

When the decision in step S61 si "No", steps S62 and S63 are skipped. In step S64, a decision is made whether or not the time count operation of the timer TM3 has been completed. When the decision in step S64 is "Yes", a decision is made in step S65 whether or not all the documents stacked in the document tray have been fed. When the decision in step S65 is "Yes", a decision is made in step S66 whether or not the discharge detector 44 of the document discharge unit has detected the trailing edge of the document. When the decision in step S66 is "Yes", the timer TM6 is set in step S67. In step S68, a decision is made whether or not the time count operation of the timer TM6 has been completed. When the decision in step S68 is "Yes", the conveyor belt 39 is stopped in step S69, the even-numbered page flag is reset in step S70, the odd-numbered page flag is in step S71, and then the routine returns to the main routine. When the decision in step S66 is "No", step S67 is skipped. When the decision in step S68 is "No", steps S69, S70 and S71 are skipped.

When the decision in step S65 is "No", the routine goes to step S72 to engage the clutch connected to the pinch roller to feed a document. In step S73, a decision is made whether or not the feed detector 37 has detected the trailing edge of the document. When the decision in step S73 is "Yes", a timer TM4 for determining a time interval necessary for conveying the document to the predetermined position on the contact table by the conveyor belt 39 is set in step S74. The time interval for which the timer TM4 is set is dependent on the size of the document. When the decision in step S73 is "No", step S74 is skipped.

In step S75, a decision is made whether or not the time count operator of the timer TM4 has been completed. When the decision in step S75 is "No", the roùtine goes to step S82 and, when "Yes", steps S76, S77 and S78 are executed to stop the conveyor belt 39, to disengage the clutch connected to the pinch roller, and the brake is applied to terminate the operation of the document conveying mechanism. Then, a timer TM5 for determining a brake releasing timing is set in step S79, the copy start flag is set in step S80, and then the document feed flag is set in step S81.

In step S82, a decision is made whether or not the time count operation of the timer TM5 has been completed. When the decision in step S82 is "Yes", the brake is released in step S83, the copy tart flag is reset in step S84, the even-numbered page flag is reset in step S85, the odd-numbered page flag is set in step S86, and then the routine returns to the main routine. When the decision in step S82 is "No", the routine returns immediately to the main routine.

The main routine for controlling the copying apparatus will be described hereinafter.

Figure 9A:
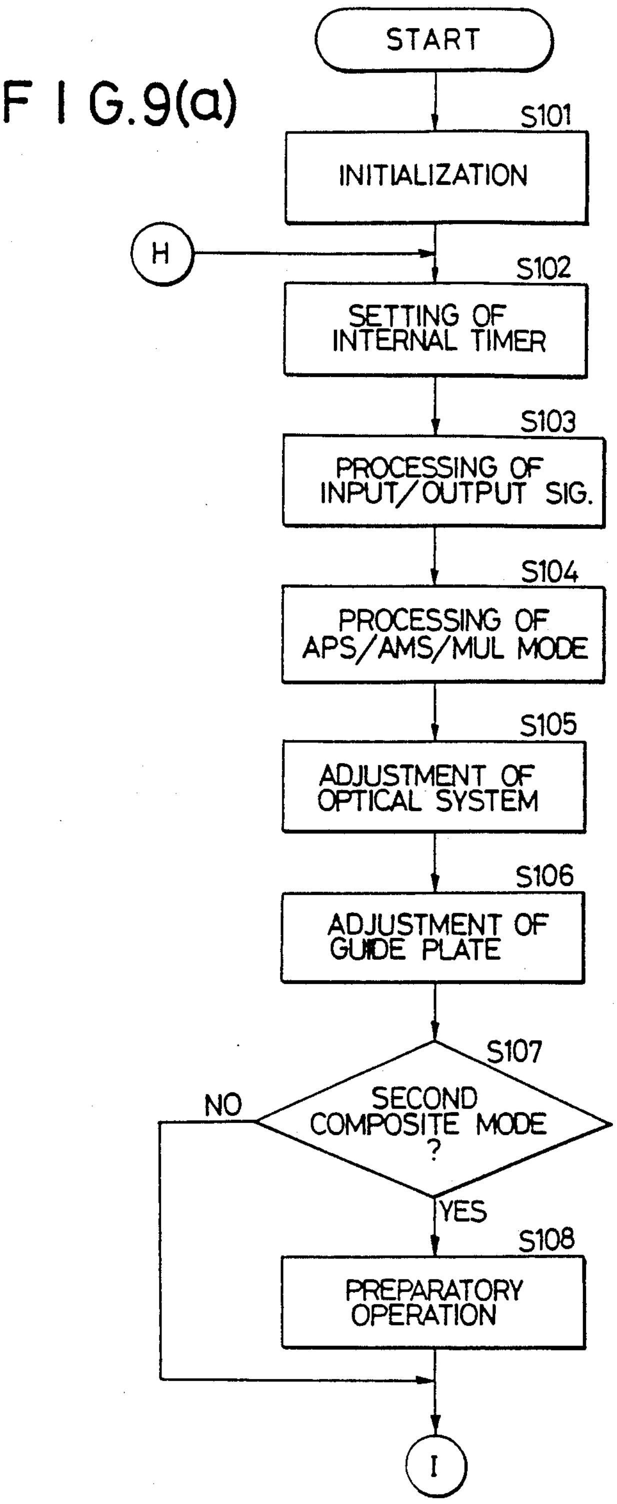
Figure 9B:
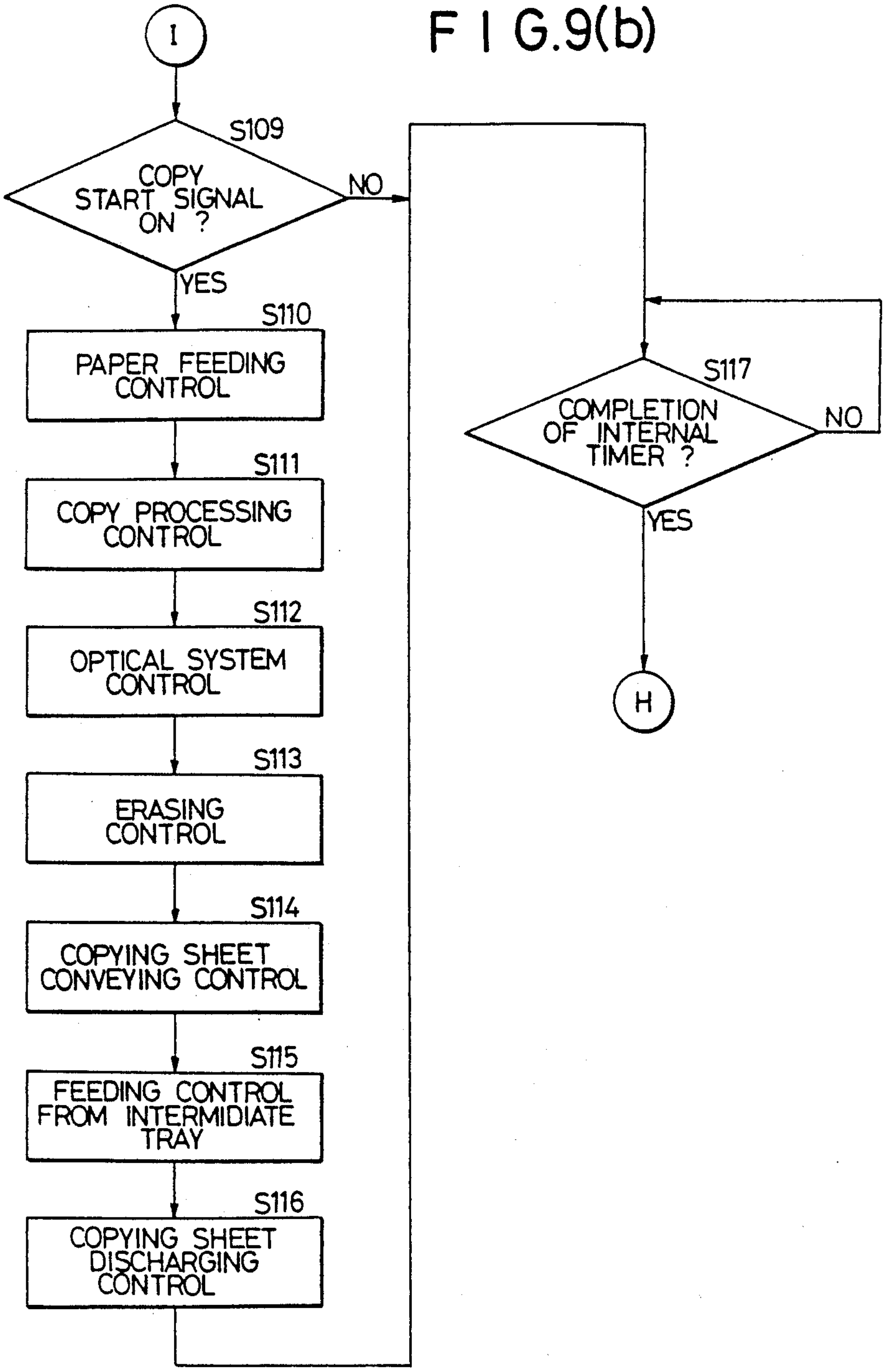
Figure 10A:
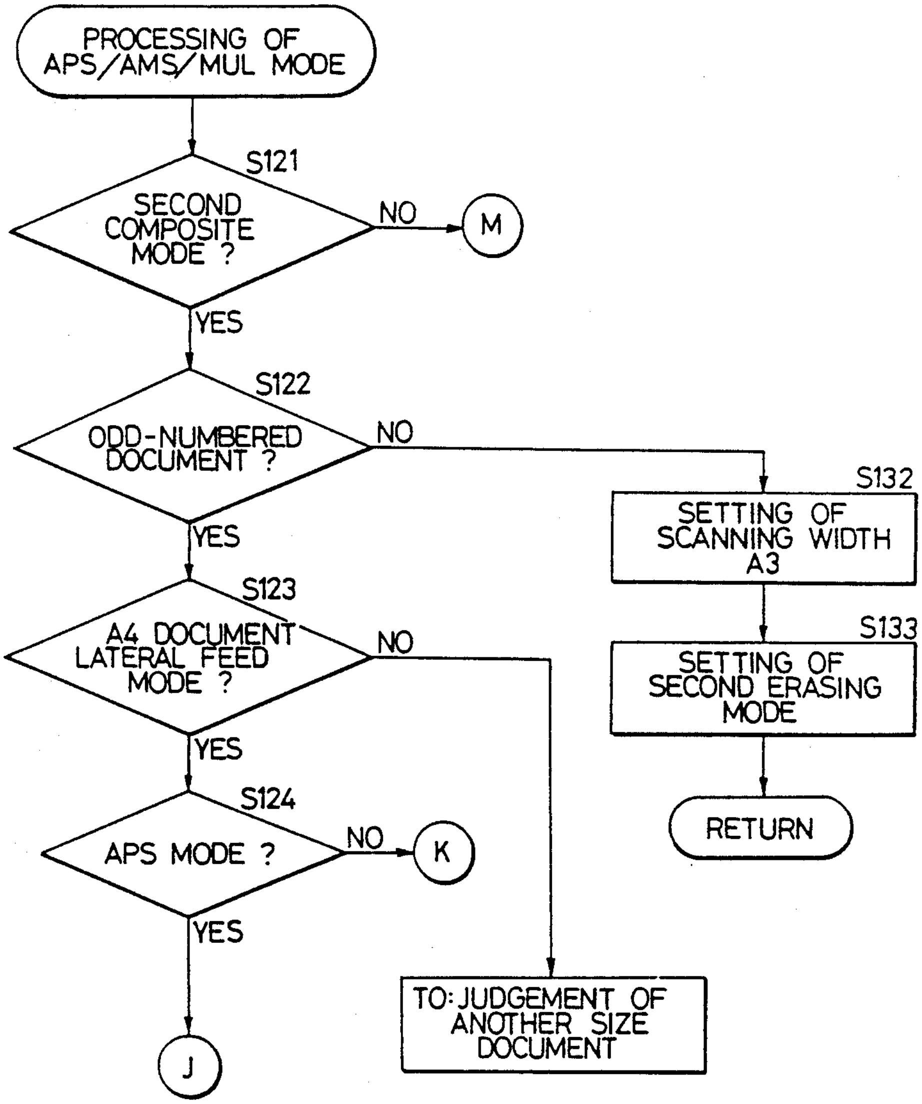
Figure 10B:
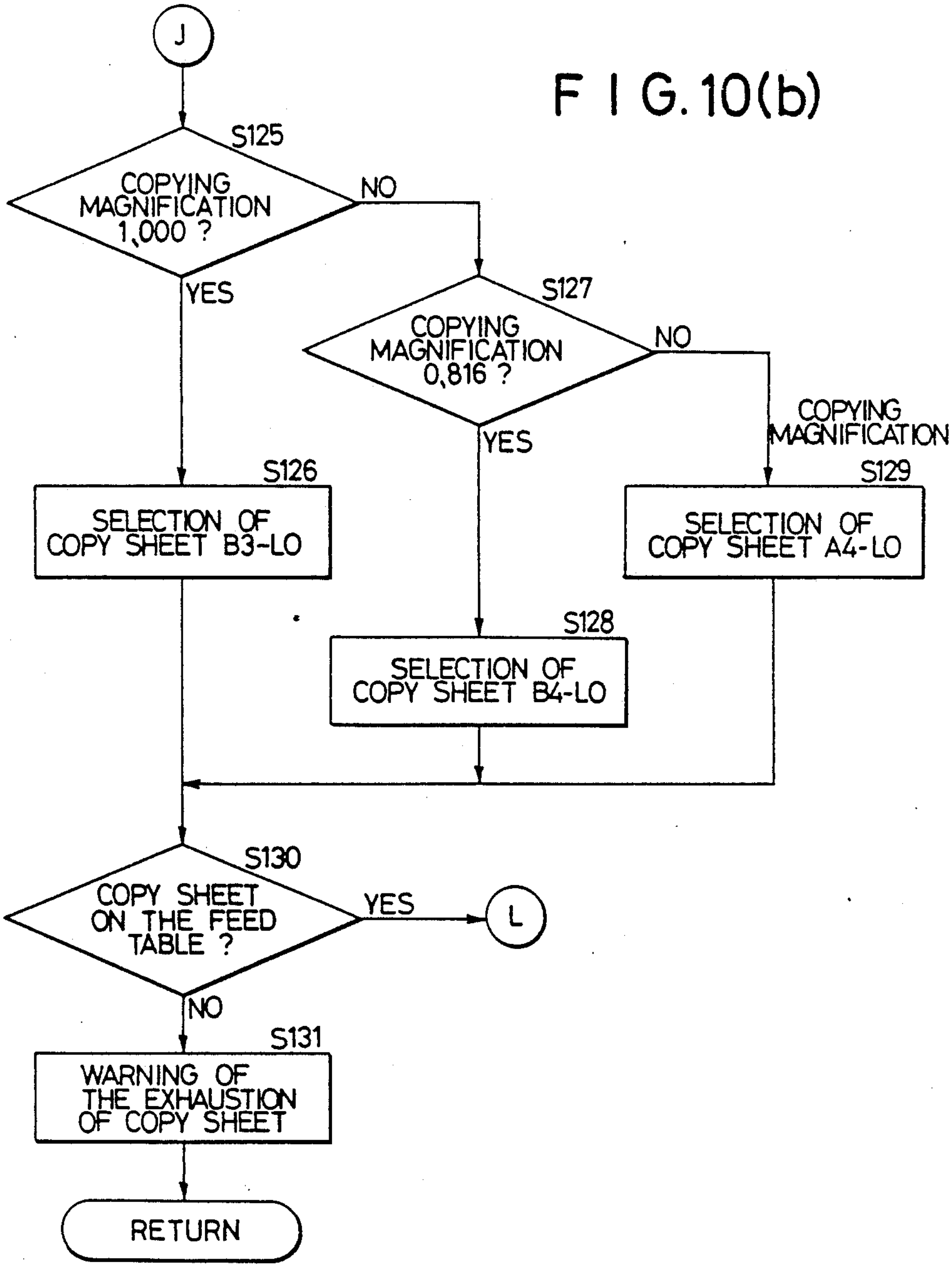
Figure 10C:
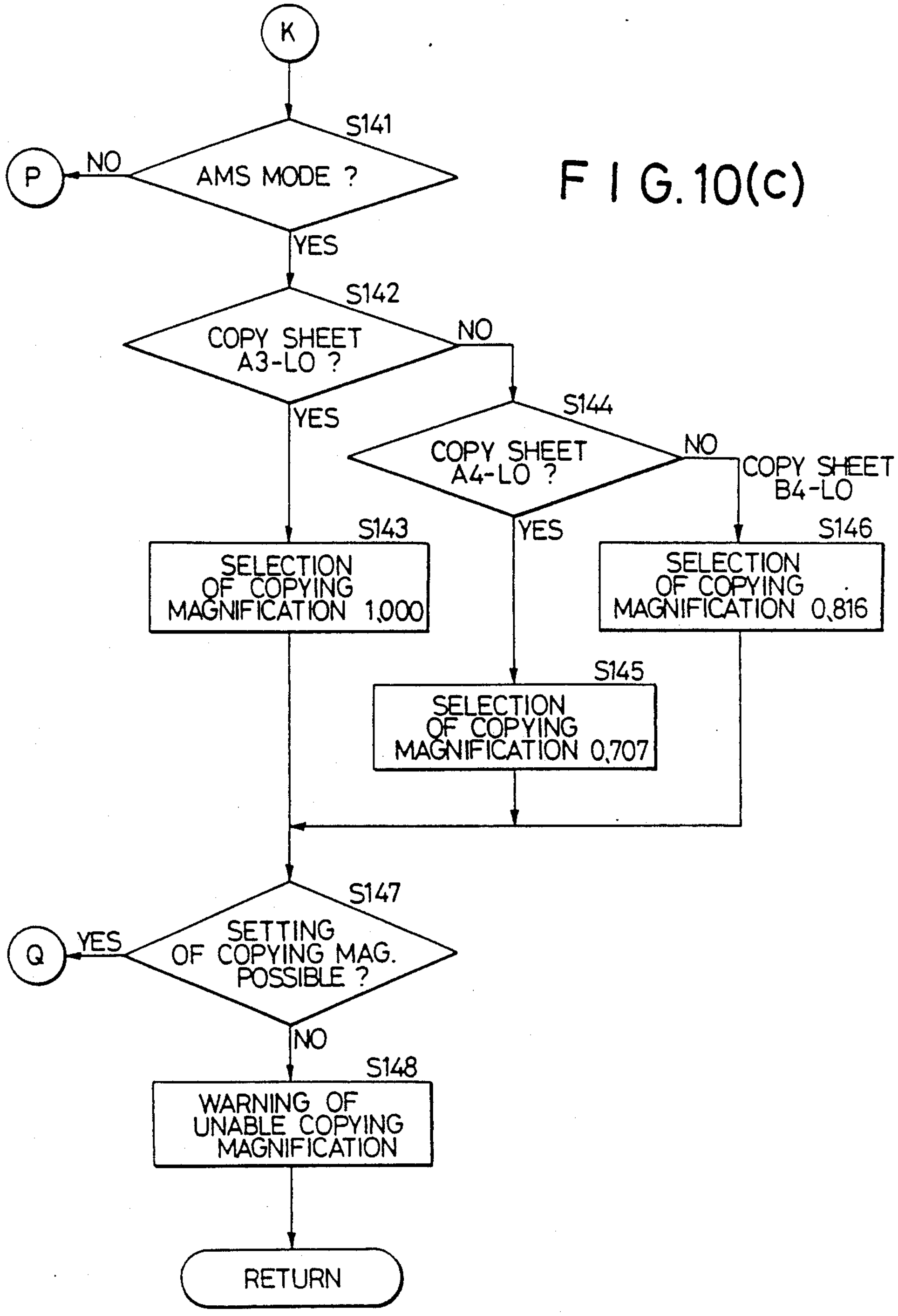
Figure 10D:
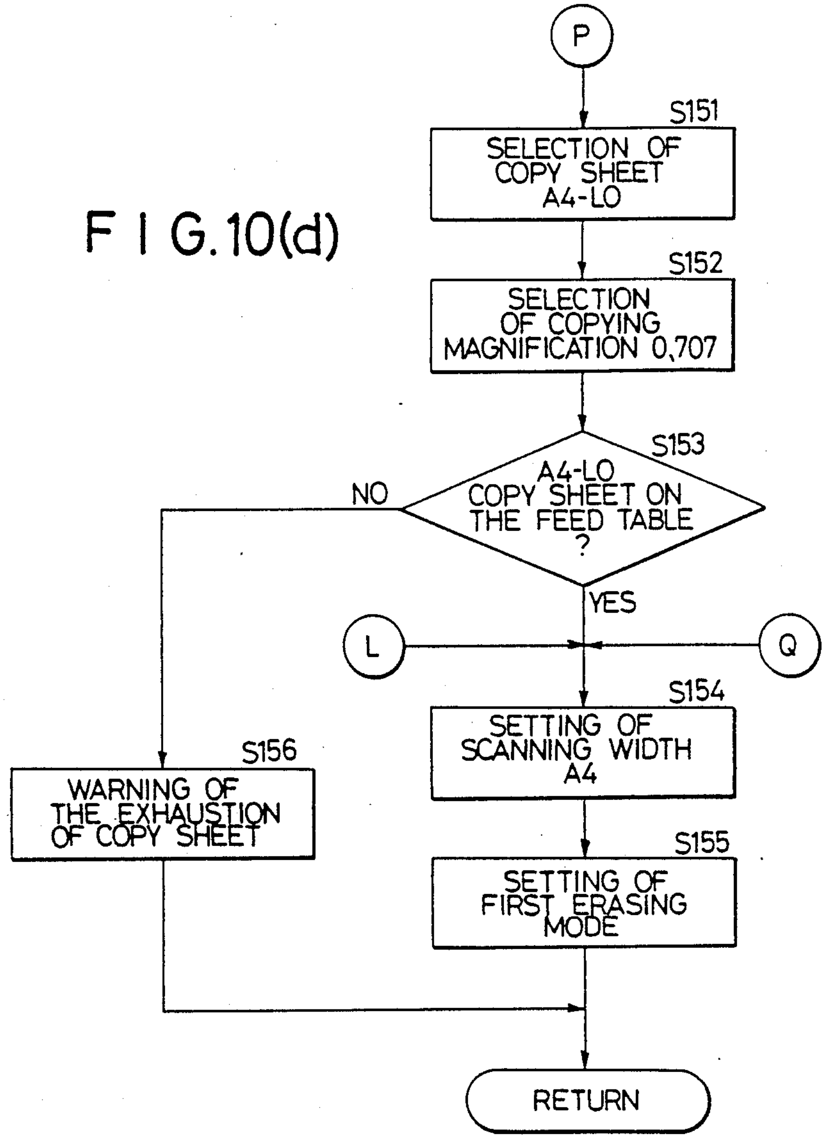
Figure 10E:
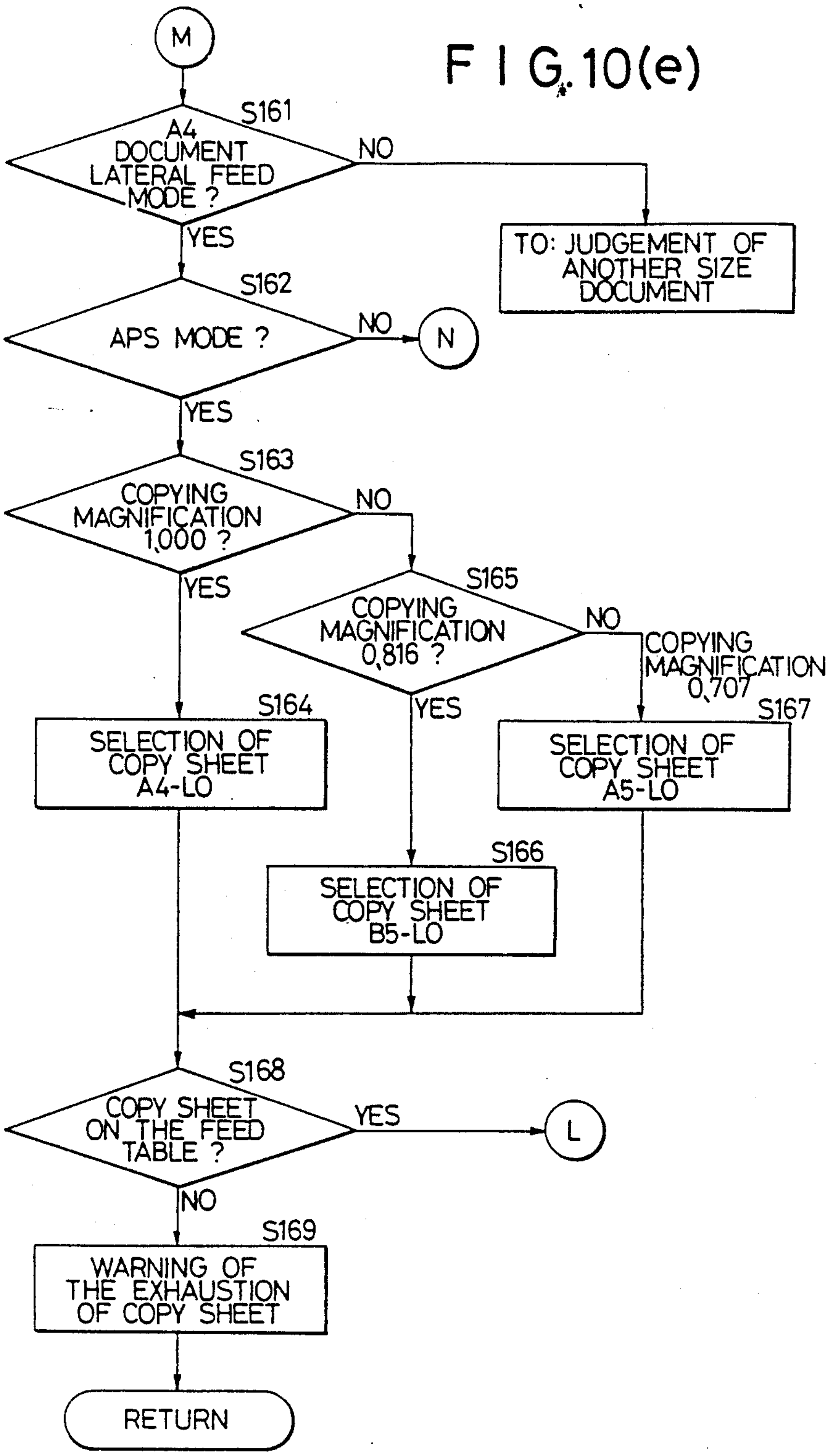
Figure 10F:
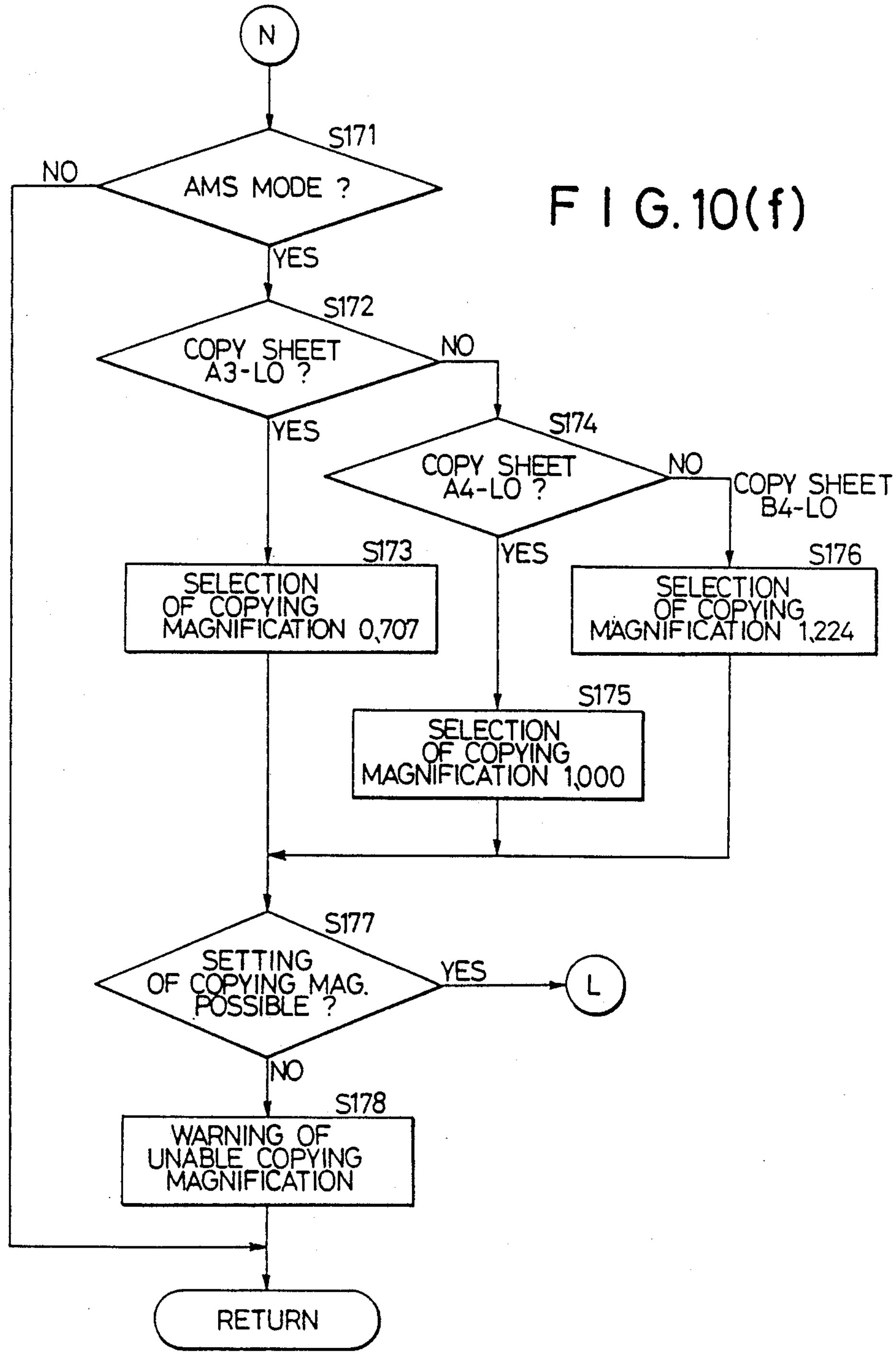

Referring to FIG. 9, upon the connection of the copying machine to a power source, step S101 is executed to initialize the copying apparatus control CPU 61 by clearing the memories and resetting flags. Then, in step S102, an internal timer for regulating the execution of the main routine is set. In step S103, input signals given to the CPU 61 by the detectors and output command signals are processed. In step S104, a copying mode among the APS mode, the AMS mode, which will be described hereinafter, is selected and processed.

The optical scanning system 2 is adjusted to a copying magnification in step S105, and the guide plates 23 and 24 of the intermediate tray 20 are adjusted to positions corresponding to the size of selected copying sheets in step S106.

In step S107, a decision is made whether or not the second composite copying mode is selected. When the decision in step S107 is "Yes", a preparatory operation including setting the guide member 17 so as to guide the copying sheet into the intermediate tray 20 and setting the guide plates 23 and 24 on the intermediate tray 20 is carried out in step S108. When the decision in step S107 is "No", step S108 is skipped.

In step S109, a decision is made whether or not the copy start signal CPST is provided by the ADF control CPU 60. When the decision in step S109 is "Yes", the copying operation is started to carry out a series of copying procedures in steps S11O through S116. That is, the copying apparatus carries out the copying procedure including feeding a copying sheet, charging the photosensitive drum, developing the electrostatic latent image of the document, transferring the developed image to the copying sheet, removing electric charge from the photosensitive drum, and erasing residual images, a scanning procedure including scanning the document by the optical scanning system and projecting the optical image of the document of the photosensitive drum for exposure, erasing a portion of an electrostatic latent image formed in a blank area and a boundary area on the circumference of the photosensitive drum in the second composite copying mode, arranging the sheet conveying passages for the second composite copying mode, feeding the copying sheet from the intermediate tray, and discharging the copying sheet.

Upon the end of the time determined by the internal timer in step S117, the routine returns to step S102. When the decision in step S109 is "No", the routine jumps to step S117 without executing the copying operation controlling steps.

The selection of a copying mode among the APS mode, the AMS mode and the MUL mode to be executed in step S104 will be described hereinafter with reference to FIG. 10. In this explanation, the document size is supposed, by way of example, to be A4, however, the document size is not limited thereto.

In step S121, a decision is made whether or not the second composite copying mode is selected. When the decision in step S121 is "Yes", a decision is made in step S122 whether or not the document to be fed is an odd-numbered document. When the decision in step S122 is "No", the optical scanning system is set for a scanning width corresponding to the width of the entire area of the contact glass corresponding to the size A3 in this embodiment in step S132, an second erase mode, which will be described hereinafter, is set in step S133, and then the routine returns to the main routine.

When the decision in step S122 is "Yes", a decision is made in step S123 whether or not a document of the size A4 is fed with its longer side perpendicular to the document feed direction. Such a document feeding mode will be referred to as "A4 document lateral feed mode" and a document feeding mode in which a document of size A4 is fed with its shorter side perpendicular to the document feed direction will be referred to as "A4 document longitudinal feed mode" hereinafter. The decision in step S123 is made on the basis of a detection signal provided by a detector, not shown, provided in the automatic document feeder. Although another judgement is made to discriminate the selected document feeding mode, such as a B5 document lateral feed mode, when the decision in step S123 is "No", steps of control procedures following the discrimination of the selected document feeding mode are the same as those which will be described hereinafter provided that the document can be copied in the second composite copying mode, except that the size of copying sheets to be used is different, and hence the description of the control routine for document feeding modes other than the A4 lateral feed mode will be omitted.

When the decision in step S123 is "Yes", a decision is made in step S124 whether or not the APS mode is selected. When the decision in step S124 is "Yes", a decision is made in step S125 whether or not the selected copying magnification is 1.000. When the decision in step S125 is "Yes", copying sheets of the size A3 are selected and the copying sheets are fed with its longer side in parallel to the feed direction. Such a copying sheet will be referred to as "A3 copying sheet of longitudinal feeding (A3-LO)"hereinafter. When the decision in step S125 is "No", a decision is made in step S127 whether or not the selected copying magnification is 0.816. When the decision in step S127 is "Yes", copying sheets of the size B4 and the B4 copying sheet of longitudinal feeding (B4-LO) are selected. When the decision in step S127 is "No", the selected copying magnification is 0.707 and hence copying sheets of the size A4 and the A4 copying sheet of longitudinal feeding (A4-LO) are selected in step S129. Then, a decision is made in step S130 whether or not the selected copying sheets are stored on the copying sheet feed table or in a cassette. When the decision in step S130 is "No", a copying sheet exhaustion alarm is displayed in step S131, and then the routine returns to the main routine.

Thus, in the second composite copying mode, copying sheets of a size double the size selected in the APS mode in the normal copying mode are selected to copy two documents on the surface of a single copying sheet.

When the decision in step S124 is "No", the routine goes to step S141 to decide whether or not the AMS mode is selected. When the decision in step S141 is "Yes", a copying magnification of 1.000 is selected when the A4 document lateral feed mode and the A3 copying sheet of longitudinal feeding (A3-LO) are selected, a copying magnification of 0.707 is selected when the A4 document lateral feed mode and the A4 copying sheet of longitudinal feeding (A4-LO) are selected, and a copying magnification of 0.816 is selected when the A4 document lateral feed mode and the B4 copying sheet of longitudinal feeding (B4-LO) are selected in steps S142 through S146. In step S147, a decision is made whether or not the selected copying magnification is possible. When the decision in step S147 is "No", a magnification setting unable alarm is given in step S148, and then the routine returns to the main routine. When the decision in step S147 is "Yes", the scanning width of the optical scanning system is adjusted to a width corresponding to that of the size A4 in step S154, a first erasing mode is set in step S155, and then the routine returns to the main routine.

Thus, in the second composite mode and the AMS mode, a magnification which is one-half a magnification conforming to the size of the copying sheet is selected so that two documents can be copied on the surface of a single copying sheet through the composite copying operation.

When the decision in step S141 is "No", the routine goes to step S151 to allow the manual selection of copying sheets and a copying magnification. In this explanation, the A4 copying sheet of longitudinal feeding (A4-LO) and a copying magnification of 0.707 are selected in steps S151 and S152, respectively. In step S153, a decision is made whether or not copying sheets of the size A4 is available. When the decision in step S153 is "Yes", the routine goes to step S154 and, when "No", a copying sheet exhaustion alarm is given in step S156, and then the routine returns to the main routine. When the decision in step S130 is "Yes", routine also goes to step S154.

When the decision in step S121 is "No", namely when the second composite copying mode is not selected, step S161 and the following steps are executed.

In step S161, a decision is made whether or not the document lateral feed mode is selected. When the decision in step S161 is "No", another decision is made to discriminate the selected document feed mode and the size of the document, for example, a decision whether or not the size of the document is the size B5, steps following the discrimination are similar as steps which will be described hereinafter, and hence the description of steps following the discrimination will be omitted.

When the A4 document lateral feed mode is selected, a decision is made in step S162 whether or not the APS mode is selected. When the decision in step S162 is "Yes", namely, when the APS mode is selected, a copying magnification entered by means of the key of the control panel is examined in steps S163 and S165. When the magnification is 1.000, the A4 copying sheet of longitudinal feeding (A4-LO) is selected in step S164, when the selected copying magnification is 0.861, the B5 copying sheet of longitudinal feeding (B5-LO) is selected in step S166, and when the selected copying magnification is 0.707, the A5 copying sheet of longitudinal feeding (A5-LO) is selected in step S167. Then a decision is made in step S168 whether or not the selected copying sheet is available. When the decision in step S168 is "No", a copying sheet exhaustion alarm is given in step S169, and then the routine returns to the main routine.

When the decision in step S162 is "No", a decision is made in step S171 whether or not the AMS mode is selected. When the decision in step S171 is "Yes", a copying magnification of 0.707 is selected when the A4 document lateral feed mode and the A3 copying sheet of longitudinal feeding are selected, a copying magnification of 1.00 is selected when the A4 document lateral feed mode and the A4 copying sheet of longitudinal feeding are selected, and a copying magnification of 1.224 is selected when the A4 document lateral feed mode and the B4 copying sheet of longitudinal feeding are selected in steps S172 through S176. In step S177, a decision is made whether the selected copying magnification is possible. When the decision in step S177 is "No", a copying magnification unable alarm is given in step S178, and then the routine returns to the main routine. When the decision in step S177 is "Yes", the optical scanning system is set for a scanning width corresponding to that of the size A4 in step S154, the first erasing mode is set in step S155, and then the routine returns to the main routine.

The first erasing mode (step S155) and the second erasing mode (step S133) will be described hereinafter with reference to FIGS. 11 and 12.

Figure 11:
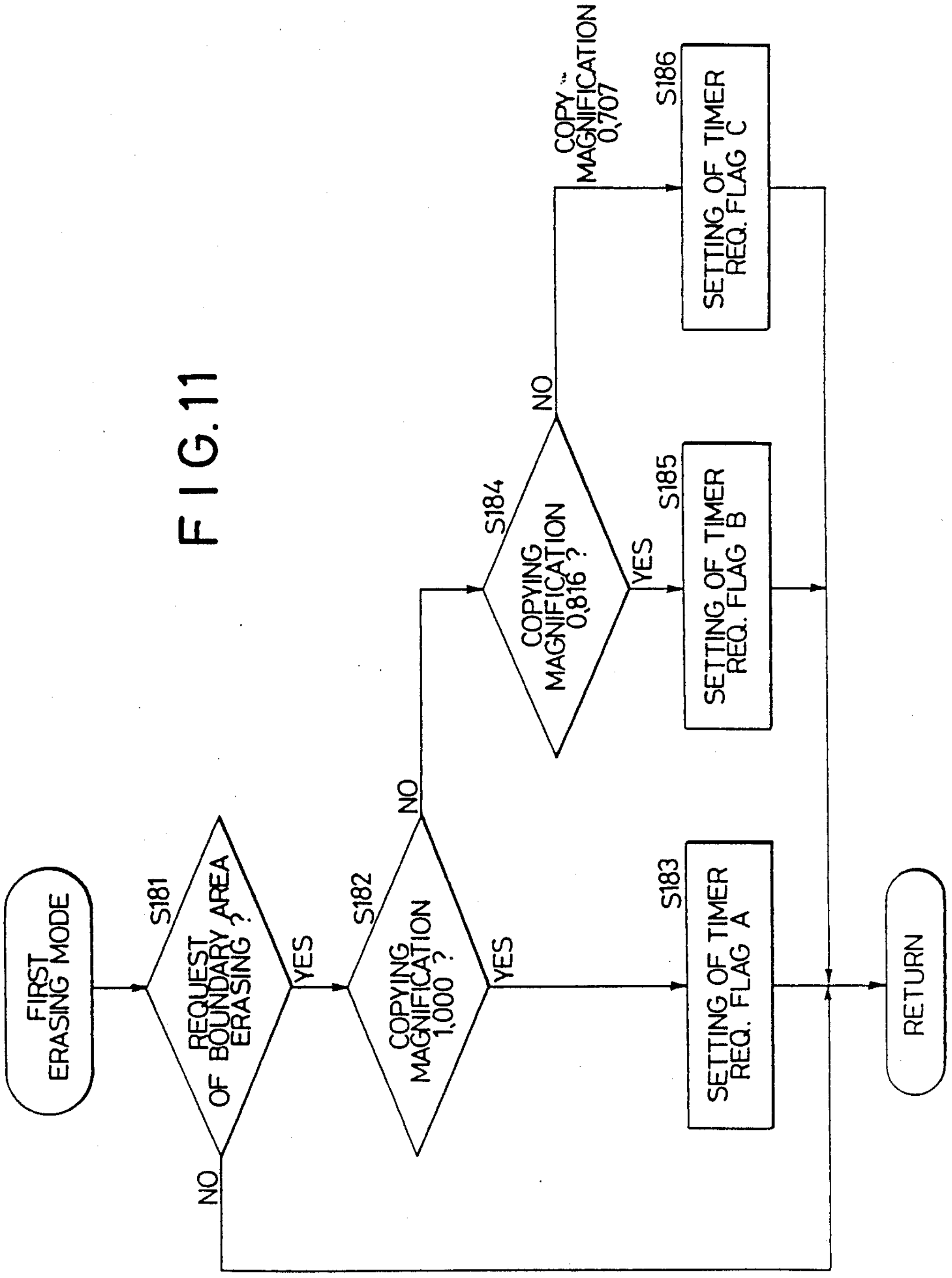

Referring to FIG. 11 showing the steps of a routine for setting the first erasing mode, a decision is made in step S181 whether or not a boundary area erasing command to erase the boundary area between the respective images of two documents to be copied on the surface of a single copying sheet in the composite copying mode is entered by means of the boundary area erasing key 72. When the decision in step S181 is "No", the routine returns immediately to the main routine. When the decision in step S181 is "Yes", a flag to request setting a timer $T_1$ which determines an erasing width corresponding to the selected copying magnification for a predetermined time is set. That is, a flag A is set when the selected copying magnification is 1.00, a flag B is set when the selected copying magnification is 0.816, and a flag C is set when the selected copying magnification is 0.707 (steps S182 through S186). Then, the routine returns to the main routine.

Figure 12:
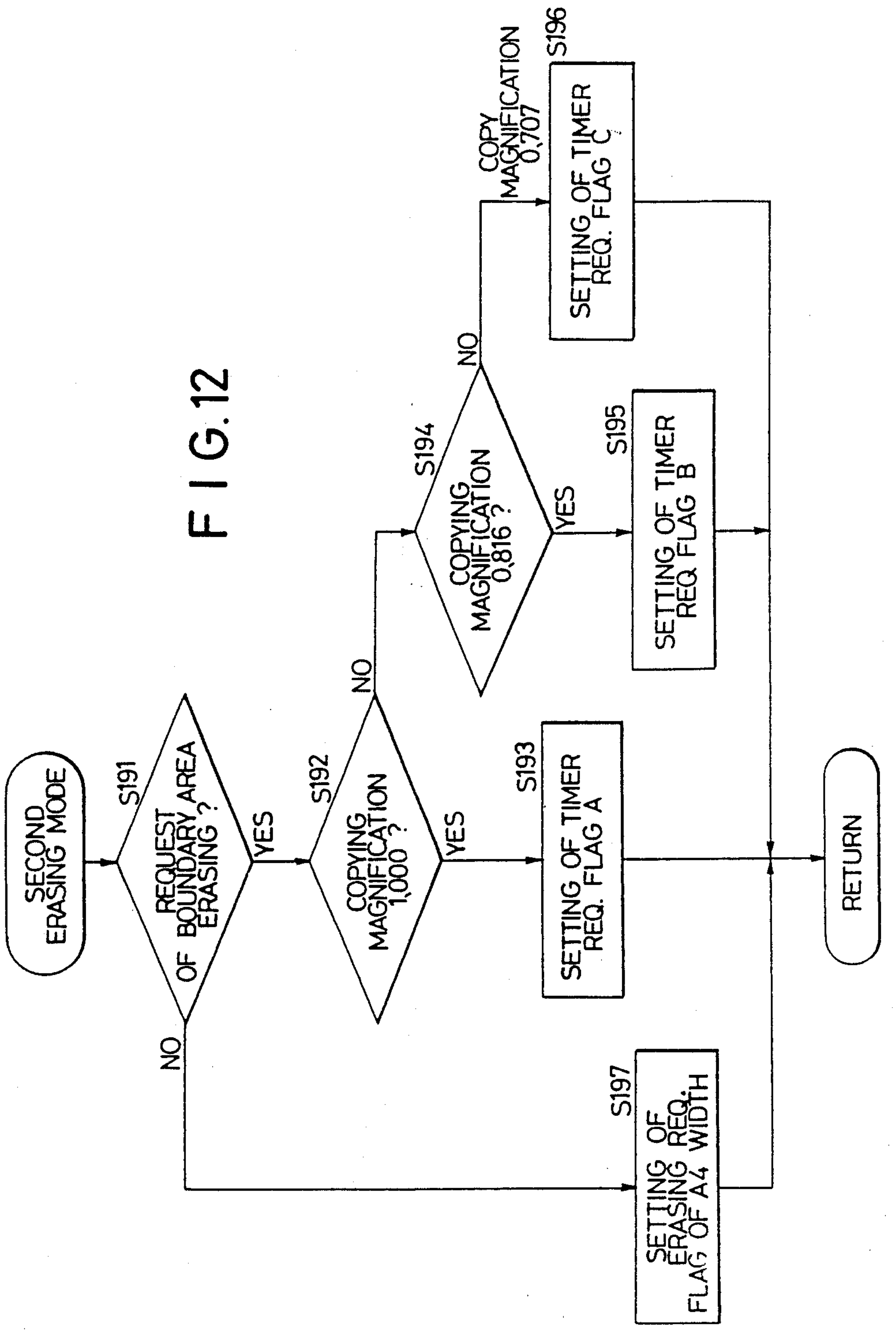

FIG. 12 shows the steps of a routine for controlling the second erasing mode. In the second erasing mode, a document is positioned at the position B (FIG. 1) and hence the electrostatic latent image of stain and foul spots in the front half of the contact glass is formed on the photosensitive drum, and the image of the stain and the foul spots is copied on the copying sheet in an area where the image of a document is copied previously. Therefore, the electrostatic latent image formed in an area on the photosensitive drum corresponding to an area of the size A4 in the front half of the contact glass must be erased. Accordingly, when request to erase the boundary area is not made, namely, when the decision in step S191 is "No", a flag requesting the erasure of the electrostatic latent image on the photosensitive drum in the area corresponding to the width of A4 in the front half of the contact glass is set in step S197. The rest of the steps S192 through S196 for checking the selected copying magnification and setting a flag to request setting the timer for a predetermined time corresponding to the selected copying magnification are the same as the steps S182 through S186 of the first erasing mode control routine shown in FIG. 11.

Figure 13A:
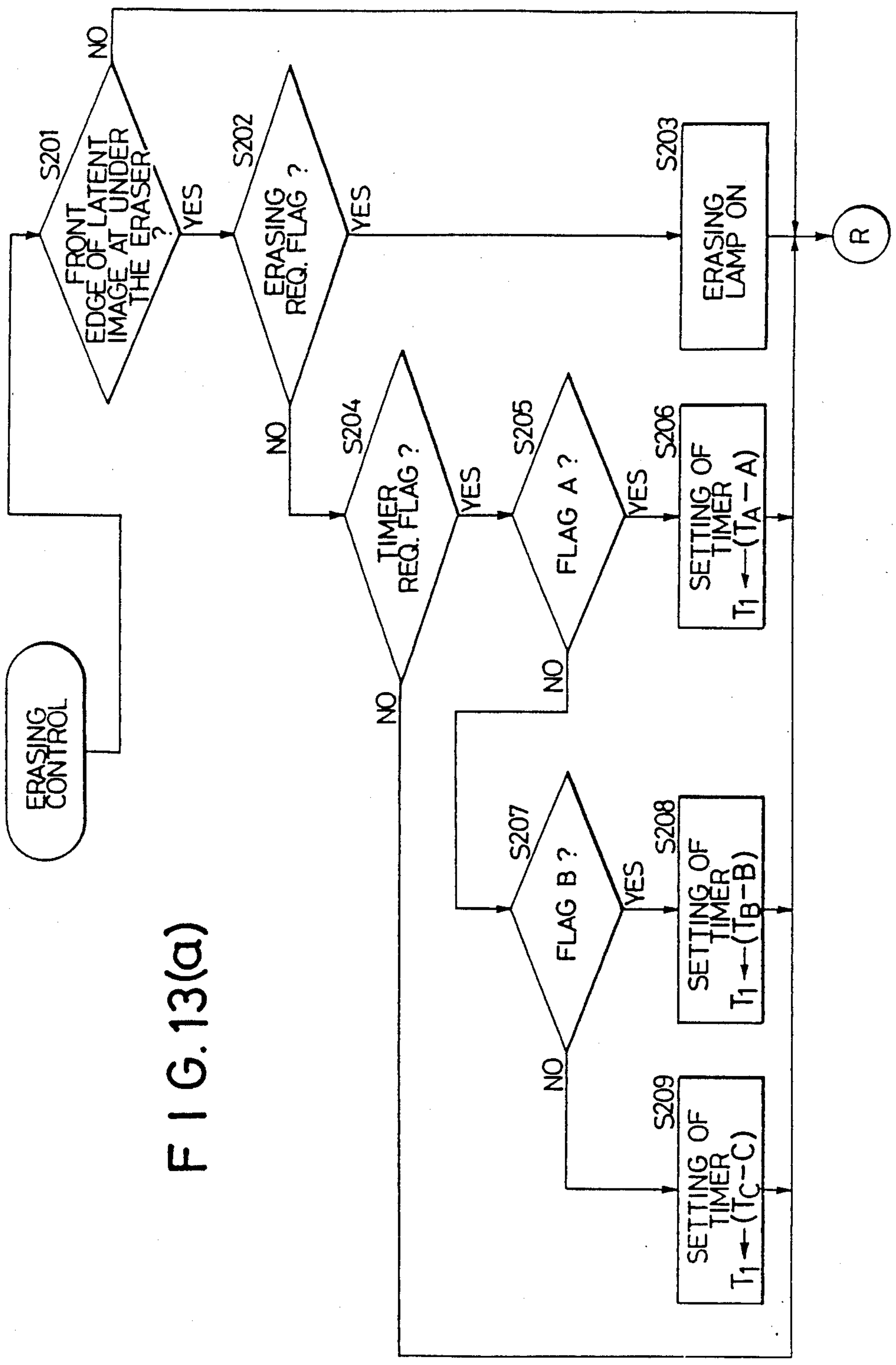
Figure 13B:
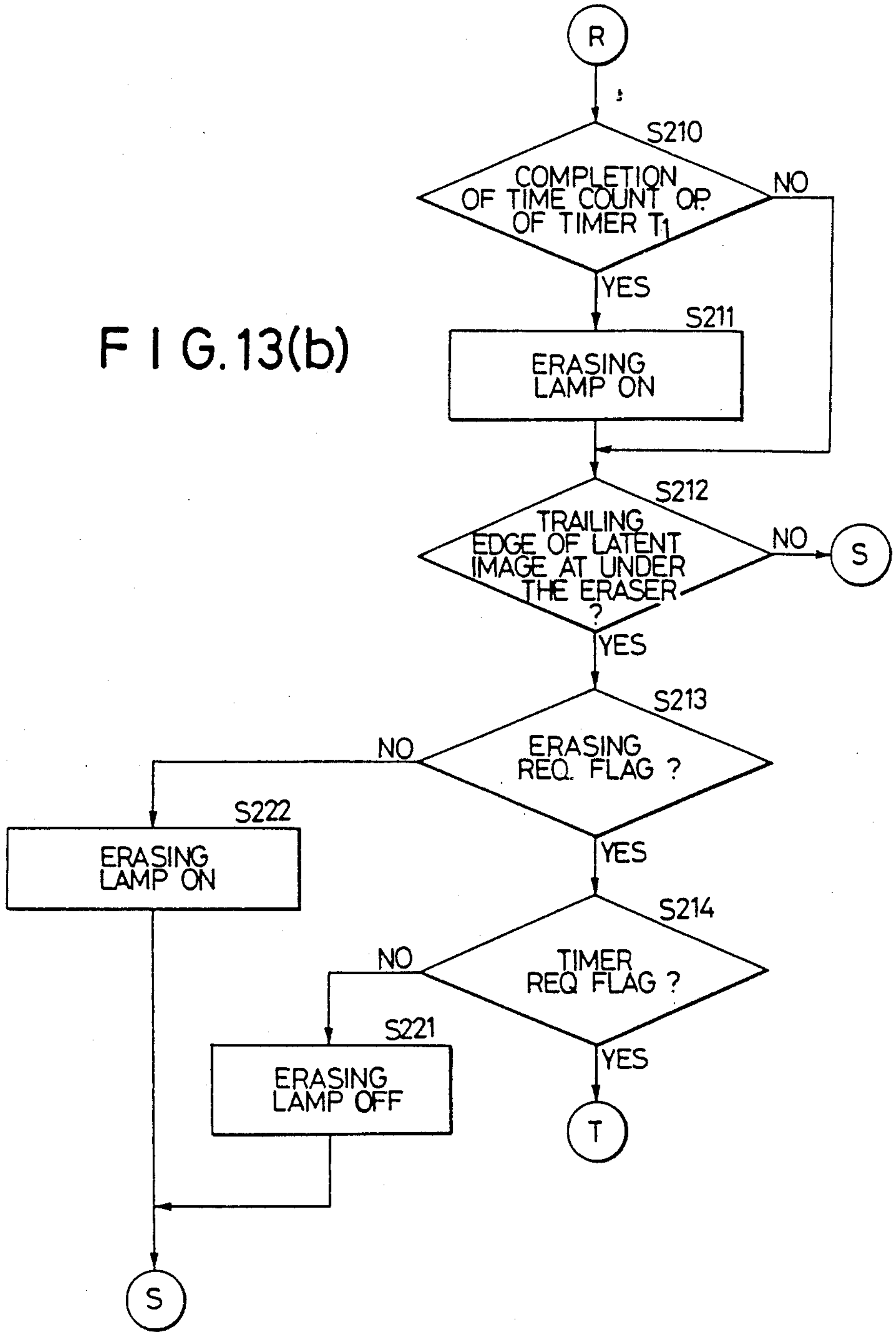
Figure 13C:
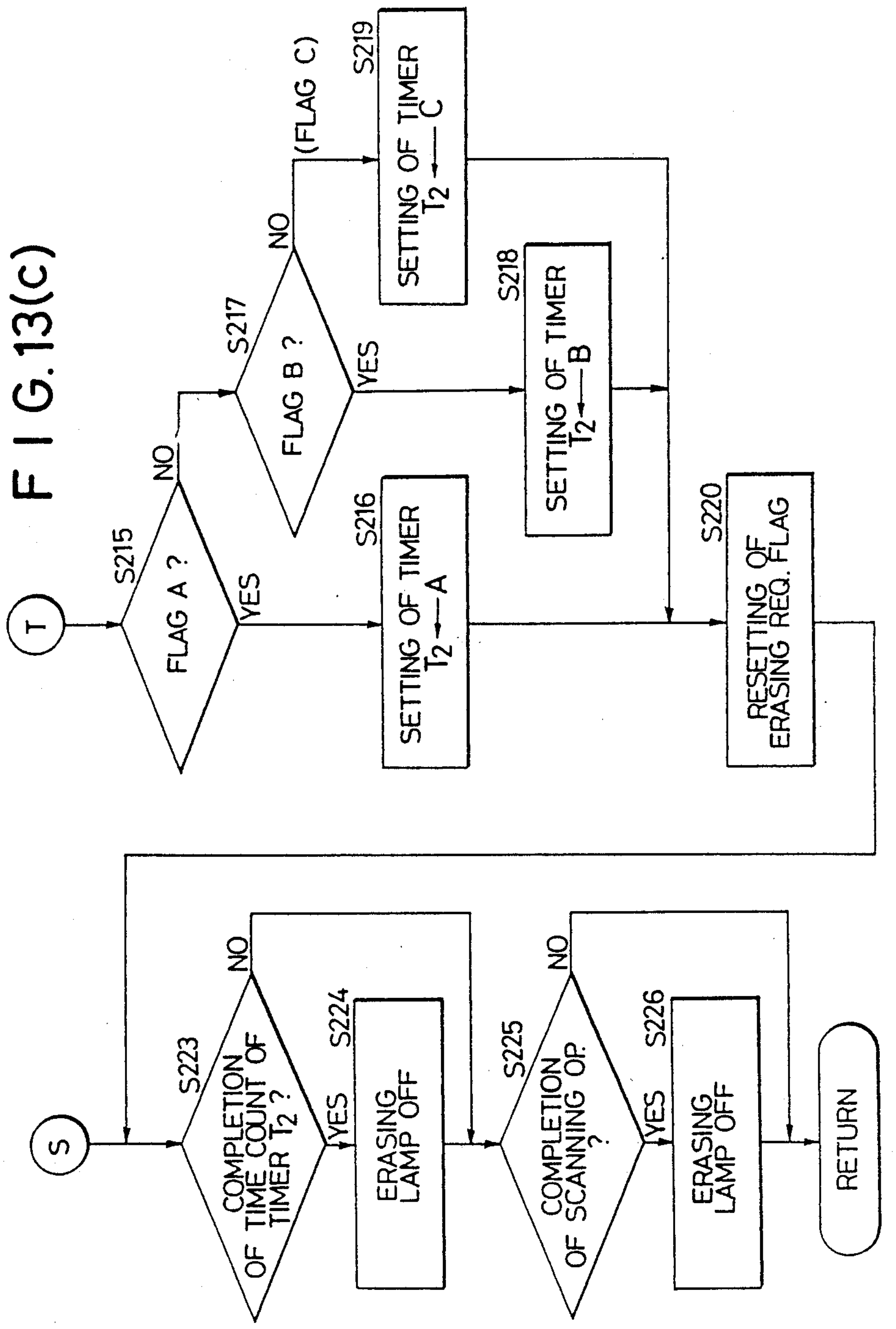

Part of the erasing control operation in step S113 of the flow chart of FIG. 9 relating to the erasing modes will be described hereinafter with reference to FIG. 13.

In step S201, a decision is made, on the basis of the angular phase signal SEN-DM indicating the angular phase of the photosensitive drum, whether or not the front edge of an electrostatic latent image formed on the circumference of the photosensitive drum has arrived at a position directly under the eraser. When the decision in step S201 is "No", the routine goes to step S210. When the decision in step S201 is "Yes", a decision is made in step S202 whether or not an erasing request flag requesting the erasure of the electrostatic latent image formed in an area on the photosensitive drum corresponding to an area of the size A4 on the contact glass is set. When the decision in step S202 is "Yes", the erasing lamp 69 is lighted up in step S203. When the decision in step S202 is "No", a decision is made in step S204 whether or not a timer setting request flag is set. When the decision in step S204 is "No", the routine jumps to step S210. When the decision ion step S204 is "Yes", the timer setting request flag is discriminated, namely, decisions are made whether the timer setting request flag is the flag A, the flag B or the flag C, and then the timer $T_1$ is set for the time corresponding to the timer setting request flag to start measuring time (steps S205 through S209). When the timer setting request flag is:

(1) flag A $$T_1 = T_A - A$$

(2) flag B $$T_1 = T_B - B$$

(3) flag C $$T_1 = T_C - C$$

where $T_A$ is time necessary for scanning an area of the size A4 when the copying magnification is 1.000, $T_B$ is time necessary for scanning an area of the size A4 when the copying magnification is 0.816, $T_C$ is time necessary for scanning an area of the size A4 when the copying magnification is 0.707, and A, B and C are constants dependent on the copying magnifications, respectively, representing time intervals corresponding to half the respective widths of the boundary areas to be erased.

In step S210, a decision is made whether or not the time count operation of the timer $T_1$ has been completed. When the decision in step S210 is "Yes", namely, on the arrival of the starting of erasing operation, the erasing lamp is lighted up in step S211. When the decision in step S210 is "No", step S211 is skipped.

In step S212, a decision is made, on the basis of the angular phase of the photosensitive drum, whether or not the trailing edge of the electrostatic latent image formed on the circumference of the photosensitive drum has arrived at the position directly under the eraser. When the decision in step S212 is "No", the routine goes to step S223 and, when "Yes", a decision is made in step S213 whether or not an erasing request flag requesting the erasure of the electrostatic latent image in an area on the circumference of the photosensitive drum corresponding to the area of the size A4 on the contact glass has been set. When the decision in step S213 is "No", the erasing lamp 69 is lighted up in step S222. When the decision in step S213 is "Yes", a decision is made in step S214 whether or not a timer setting request flag is set. When the decision in step S214 is "No", the erasing lamp 69 is switched off in step S221 and, when "Yes", the timer setting request flag is discriminated, namely, decisions are made whether the timer setting request flag is the flag A, the flag B or the flag C, and then a timer $T_2$ is set for time corresponding to the timer setting request flag (steps S215 through S219) to expand the width of erasure by an increment corresponding to time A, B or C. When the timer setting request flag is:

(1) A: $T_2=A$ (2) B: $T_2=B$ (3) C: $T_2=C$ where A, B and C are constants which have been explained hereinbefore.

In step S220, the erasing request flag is reset, and then a decision is made in step S223 whether or not the time count operation of the timer $T_2$ has been completed. When the decision in step S223 is "Yes", the erasing lamp is switched off in step S224 and, when "No", step S224 is skipped. A decision is made in step S225 whether or not the scanning operation has been completed. When the decision in step S225 is "Yes", the erasing lamp is switched off in step S226, and then the routine returns to the main routine. When the decision in step S225 is "No", step S226 is skipped and the routine returns to the main routine.

As apparent from the foregoing description, according to the present invention, two successive documents among a plurality of documents can be copied automatically on the surface of a single copying sheet, so that a large number of documents can efficiently be copied.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. In a copying apparatus comprising a document feeding means for feeding a document to an exposure station and for discharging the document from the exposure station after exposure, image forming means for forming an image of the document on a copy sheet, sheet feeding means for feeding a copy sheet to the image forming means, and sheet re-feeding means for re-feeding the copy sheet having said image formed thereon to said image forming means, a method for controlling the copying apparatus comprising the steps of:

feeding a first document to said exposure station;

feeding a copy sheet to said image forming means;

forming said image of the first document on a half area of one surface of the copy sheet;

discharging said first document from the exposure station and feeding a second document to the exposure station;

re-feeding said copy sheet to said image forming means; and forming an image of the second document on the other half area of said one surface of the copy sheet;

the image of the first document and the image of the second document thereby being formed side by side on said copy sheet.

2. The method for controlling the copying apparatus claimed in claim 1, wherein said image of the first document and said image of the second document are formed on said copy sheet side by side successively in a paper feed direction.

3. In a composite copying apparatus comprising a document support means for supporting a plurality of documents, a document feeding means for feeding said documents one by one to an exposure station and for discharging the documents from the exposure station after exposure, image forming means for forming an image of the document on a copy sheet, sheet feeding means for feeding a copy sheet to the image forming means, sheet re-feeding means for re-feeding the copy sheet to said image forming means, and discharging means for discharging the copy sheet from the apparatus, a method for controlling the copying apparatus comprising the steps of:

(1) feeding a first document from a plurality of documents supported by said document support means to said exposure station;

(2) feeding a copy sheet to said image forming means;

(3) forming an image of said first document on a half area of one surface of the copy sheet;

(4) discharging said first document from the exposure station and feeding a second document from said plurality of documents on said document support means to the exposure station;

(5) re-feeding said copy sheet to said image forming means;

(6) forming an image of said second document on the other half area of said one surface of the copy sheet, whereby the image of the first document and the image of the second document are formed side by side on said one surface of said copy sheet;

(7) discharging said copy sheet having the images of the first and second documents from the apparatus;

(8) repeating steps (1) through (7) until images have been formed of all of said plurality of documents supported by said document support means and all of the copy sheets on which images have been formed have been discharged.

4. The method for controlling the copying apparatus claimed in claim 3, wherein said image of the first document and said image of the second document are formed on said copy sheet side by side successively in a paper feed direction.

5. In a composite copying apparatus comprising a document support means for supporting a plurality of numbered documents, a document feeding means for feeding said documents one by one to an exposure station and for discharging the documents from the exposure station after exposure, image forming means for forming an image of one document on a copy sheet, sheet feeding means for feeding the copy sheet to the image forming means, and sheet re-feeding means for re-feeding the copy sheet to said image forming means, a method for controlling the copying apparatus comprising the steps of:

feeding to said exposure station one of a plurality of odd-numbered documents from said plurality of numbered documents supported by said document support means;

feeding a copy sheet to said image forming means when said odd-numbered document is fed to said exposure station;

forming an image of said odd-numbered document on a half area of one surface of said copy sheet;

discharging the odd-numbered document from the exposure station and feeding a successive even-numbered document from said plurality of numbered documents to the exposure station;

re-feeding the copy sheet to said image forming means; and forming an image of the even numbered document on the other half area of said one surface of said copy sheet;

whereby the image of the odd-numbered document and the image of the even-numbered document are formed side by side on said copy sheet.

6. The method for controlling the copying apparatus claimed in claim 5, wherein said image of the odd-numbered document and said image of the even-numbered document are formed on said copy sheet side by side successively in a paper feed direction.

7. In a composite copying apparatus comprising a document support means for supporting a plurality of numbered documents, a document feeding means for feeding said documents one by one to an exposure station and for discharging the documents from the exposure station, image forming means for forming an image of one document on a copy sheet, sheet feeding means for feeding the copy sheet to the image forming means, and sheet re-feeding means for re-feeding the copy sheet to said image forming means, a method for controlling the copying apparatus comprising the steps of:

feeding an odd-numbered document from said plurality of numbered documents supported by said document support means to said exposure station;

feeding a copy sheet to said image forming means when said odd-numbered document is fed to said exposure station;

forming an image of said odd-numbered document on a half area of one surface of said copy sheet;

discharging the odd-numbered document from the exposure station and feeding an even-numbered document to the exposure station;

re-feeding said copy sheet to said image forming means;

forming an image of the even-numbered document on the other half area of said one surface of said copy sheet;

whereby the image of the odd-numbered document and the image of the even-numbered document are formed side by side on said copy sheet.

8. The method for controlling the copying apparatus claimed in claim 7, wherein said image of the odd-numbered document and said image of the even-numbered document are formed on said copy sheet side by side successively in a paper feed direction.

9. In a composite copying apparatus comprising a document support means for supporting a plurality of odd-numbered and even-numbered documents, a document feeding means for feeding said documents one by one to an exposure station and for discharging the documents from the exposure station, image forming means for forming an image of one document on a copy sheet, sheet feeding means for feeding the copy sheet to the image forming means, and sheet-refeeding means for re-feeding the copy sheet to said image forming means, a method for controlling the copying apparatus comprising the steps of:

feeding the documents one by one from said document support means to said exposure station;

detecting whether the document fed to the exposure document is an odd-numbered document or an even-numbered document;

feeding a copy sheet to said image forming means when an odd-numbered document is fed to said exposure station;

forming an image of the odd-numbered document on a half area of one surface of the copy sheet;

re-feeding said copy sheet to said image forming means when an even-numbered document is fed to said exposure station; and forming an image of the even-numbered document on the other half area of said one surface of said copy sheet;

whereby the image of the odd-numbered document and the image of the even-numbered document are formed side by side on said copy sheet.

10. The method for controlling the copying apparatus claimed in claim 9, wherein said image of the odd-numbered document and said image of the even-numbered document are formed on said copy sheet side by side successively in a paper feed direction.

11. A composite copying apparatus comprising:

document support means for supporting a plurality of odd-numbered and even-numbered documents;

document feeding means for feeding said documents one by one to an exposure station and for discharging the documents from said exposure station;

image forming means for forming an image of a document on a copy sheet;

sheet feeding means for feeding said copy sheet to the image forming means;

sheet re-feeding means for re-feeding said copy sheet to said image forming means;

detecting means for detecting whether the document fed to the exposure station is an odd-numbered document or an even-numbered document;

first control means, responsive to said detecting means, for controlling said document feeding means, said image forming means and said sheet feeding means so that an image of an odd-numbered document is formed on a half area of one surface of said copy sheet; and second control means for controlling said document feeding means, said image forming means and said sheet re-feeding means so that an image of an even-numbered document is formed on the other half area of said one surface of said copy sheet;

whereby the image of the odd-numbered document and the image of the even-numbered document are formed side by side on said copy sheet.

12. The composite copying apparatus claimed in claim 11, wherein said image of the odd-numbered document and said image of the even-numbered document are formed on said copy sheet side by side successively in a paper feed direction.

* * * * *